US012065916B2

(12) United States Patent
Zhang et al.

(10) Patent No.: US 12,065,916 B2
(45) Date of Patent: Aug. 20, 2024

(54) HYDRAULIC FRACTURING SYSTEM FOR DRIVING A PLUNGER PUMP WITH A TURBINE ENGINE

(71) Applicant: YANTAI JEREH PETROLEUM EQUIPMENT & TECHNOLOGIES CO., LTD., Shandong (CN)

(72) Inventors: Rikui Zhang, Shandong (CN); Xiance Li, Shandong (CN); Xincheng Li, Shandong (CN); Yipeng Wu, Shandong (CN); Chunqiang Lan, Shandong (CN); Sheng Chang, Shandong (CN); Peng Zhang, Shandong (CN); Liang Lv, Shandong (CN); Xiaolei Ji, Shandong (CN); Weipeng Yuan, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 18/182,920

(22) Filed: Mar. 13, 2023

(65) Prior Publication Data

US 2023/0212933 A1 Jul. 6, 2023

Related U.S. Application Data

(63) Continuation-in-part of application No. 17/886,221, filed on Aug. 11, 2022, which is a continuation of
(Continued)

(30) Foreign Application Priority Data

Mar. 30, 2021 (CN) .......................... 202110339066.3

(51) Int. Cl.
*E21B 43/26* (2006.01)
*F01D 15/08* (2006.01)
(Continued)

(52) U.S. Cl.
CPC .......... *E21B 43/2607* (2020.05); *E21B 43/26* (2013.01); *F01D 15/08* (2013.01);
(Continued)

(58) Field of Classification Search
CPC ...... E21B 43/2607; E21B 43/26; F01D 15/08; F01D 25/30; F02C 6/00; F02C 7/36; F05D 2260/96
See application file for complete search history.

(56) References Cited

U.S. PATENT DOCUMENTS 2,988,153 A 6/1961 Haworth et al.
3,350,138 A 10/1967 Wilms
(Continued)

FOREIGN PATENT DOCUMENTS

CA 2944968 8/2016
CN 2625578 Y 7/2004
(Continued)

OTHER PUBLICATIONS

International Search Report, dated Jun. 5, 2020, pp. 1-4, issued in International Patent Application No. PCT/CN2019/107019, China Intellectual Property Administration, Beijing, China.
(Continued)

*Primary Examiner* — James G Sayre
(74) *Attorney, Agent, or Firm* — Crowell & Moring LLP

(57) ABSTRACT

The present invention discloses a hydraulic fracturing system for driving a plunger pump with a turbine engine, including a fracturing equipment comprising a turbine engine fueled by natural gas or diesel as a power source, an exhaust system, and a plunger pump; a high-low pressure manifold; a blending equipment adapted to blend a fracturing base fluid; and a sand-mixing equipment adapted to provide the fracturing base fluid and a fracturing proppant to the high-low pressure manifold. A first end of the high-low
(Continued)

pressure manifold is connected to the fracturing equipment through a connection pipeline. A second end of the high-low pressure manifold is connected to a wellhead. An exhaust end of the turbine engine is connected to the exhaust system whereas an output driving end of the turbine engine is connected to the plunger pump via a connection device. The connection device comprises at least a reduction gearbox. An input speed of the reduction gearbox matches an output driving speed of the turbine engine, and an input torque of the reduction gearbox matches an output driving torque of the turbine engine. The exhaust system may include a diffuser.

19 Claims, 12 Drawing Sheets

Related U.S. Application Data application No. 17/544,462, filed on Dec. 7, 2021, now Pat. No. 11,499,405, which is a continuation of application No. PCT/CN2019/107026, filed on Sep. 20, 2019, application No. 18/182,920 is a continuation-in-part of application No. 17/396,188, filed on Aug. 6, 2021.

(51) Int. Cl.
  *F01D 25/30* (2006.01)
  *F02C 6/00* (2006.01)
  *F02C 7/36* (2006.01)
(52) U.S. Cl.
  CPC ............ *F01D 25/30* (2013.01); *F02C 6/00* (2013.01); *F02C 7/36* (2013.01); *F05D 2260/96* (2013.01)

(56) References Cited

U.S. PATENT DOCUMENTS

| | | | |
|---|---|---|---|
| 3,400,609 A | 9/1968 | Utter | |
| 3,418,485 A | 12/1968 | Anderson et al. | |
| 3,791,682 A | 2/1974 | Mitchell | |
| 3,881,841 A | 5/1975 | Straniti | |
| 4,341,071 A | 7/1982 | Abo et al. | |
| 5,435,975 A | 7/1995 | Bastos | |
| 5,517,822 A | 5/1996 | Haws et al. | |
| 5,709,076 A | 1/1998 | Lawlor | |
| 6,230,481 B1 | 5/2001 | Jahr | |
| 6,446,425 B1 | 9/2002 | Lawlor | |
| 7,028,461 B2 | 4/2006 | Goi | |
| 7,036,318 B1 | 5/2006 | Munson, Jr. | |
| 7,506,574 B2 | 3/2009 | Jensen et al. | |
| 7,552,903 B2 | 6/2009 | Dunn et al. | |
| 7,845,413 B2 | 12/2010 | Shampine et al. | |
| 8,506,267 B2 | 8/2013 | Gambier | |
| 8,567,354 B2 | 10/2013 | Kealy et al. | |
| 8,621,873 B2 | 1/2014 | Robertson et al. | |
| 8,801,394 B2 | 8/2014 | Anderson | |
| 9,534,473 B2 | 1/2017 | Morris et al. | |
| 9,650,879 B2 | 5/2017 | Broussard | |
| 10,030,579 B2 | 7/2018 | Austin et al. | |
| 10,060,293 B2 | 8/2018 | Del Bono | |
| 10,371,012 B2 | 8/2019 | Davis et al. | |
| 10,815,764 B1* | 10/2020 | Yeung ..................... F04B 49/20 |
| 10,954,770 B1 | 3/2021 | Yeung | |
| 10,961,993 B1 | 3/2021 | Ji et al. | |
| 10,968,837 B1 | 4/2021 | Yeung et al. | |
| 11,111,768 B1 | 9/2021 | Yeung et al. | |
| 11,181,046 B1 | 11/2021 | Brooks et al. | |
| 11,242,737 B2 | 2/2022 | Zhang | |
| 11,499,405 B2 | 11/2022 | Zhang | |
| 11,519,395 B2 | 12/2022 | Zhang | |
| 2003/0004029 A1 | 1/2003 | Lagarde et al. | |
| 2003/0171184 A1 | 9/2003 | Wige | |
| 2004/0050049 A1 | 3/2004 | Wendt et al. | |
| 2005/0221946 A1 | 10/2005 | Mitrovic | |
| 2007/0213171 A1 | 9/2007 | Pizzichil et al. | |
| 2007/0277982 A1 | 12/2007 | Shampine et al. | |
| 2009/0068031 A1 | 3/2009 | Gambier et al. | |
| 2010/0033148 A1 | 1/2010 | Deldalle | |
| 2010/0071899 A1 | 3/2010 | Coquilleau et al. | |
| 2011/0085924 A1 | 4/2011 | Shampine et al. | |
| 2011/0171044 A1 | 7/2011 | Flanigan | |
| 2013/0112029 A1 | 5/2013 | Slayter et al. | |
| 2013/0209236 A1 | 8/2013 | Xu | |
| 2014/0013768 A1 | 1/2014 | Laing | |
| 2014/0144641 A1 | 5/2014 | Chandler | |
| 2014/0174717 A1 | 6/2014 | Broussard et al. | |
| 2014/0219824 A1 | 8/2014 | Burnette | |
| 2014/0274557 A1 | 9/2014 | Chong | |
| 2014/0322034 A1 | 10/2014 | Bayyouk | |
| 2015/0184591 A1 | 7/2015 | Giancotti et al. | |
| 2015/0247421 A1 | 9/2015 | Wojick et al. | |
| 2015/0252661 A1 | 9/2015 | Glass | |
| 2015/0275891 A1 | 10/2015 | Chong | |
| 2015/0377318 A1 | 12/2015 | Byrne | |
| 2015/0381013 A1 | 12/2015 | Davies et al. | |
| 2016/0047305 A1 | 2/2016 | Wickert et al. | |
| 2016/0102581 A1 | 4/2016 | Del Bono | |
| 2016/0169322 A1 | 6/2016 | Ono | |
| 2016/0177678 A1 | 6/2016 | Morris et al. | |
| 2016/0218650 A1 | 7/2016 | Gajanayake et al. | |
| 2016/0230525 A1 | 8/2016 | Lestz et al. | |
| 2016/0281484 A1 | 9/2016 | Lestz et al. | |
| 2016/0341124 A1 | 11/2016 | Ross et al. | |
| 2016/0348479 A1 | 12/2016 | Oehring et al. | |
| 2017/0023014 A1 | 1/2017 | Clemen et al. | |
| 2017/0082110 A1 | 3/2017 | Lammers | |
| 2017/0089189 A1 | 3/2017 | Norris et al. | |
| 2017/0104389 A1 | 4/2017 | Morris et al. | |
| 2017/0218727 A1 | 8/2017 | Oehring et al. | |
| 2017/0234308 A1 | 8/2017 | Buckley | |
| 2017/0292789 A1 | 10/2017 | Hjorth et al. | |
| 2018/0111807 A1 | 4/2018 | Snider | |
| 2018/0266412 A1 | 9/2018 | Stokkevag et al. | |
| 2018/0283464 A1 | 10/2018 | Altamura | |
| 2019/0063309 A1* | 2/2019 | Davis ..................... H02K 7/116 |
| 2019/0067991 A1 | 2/2019 | Davis et al. | |
| 2019/0068026 A1 | 2/2019 | Davis | |
| 2019/0178235 A1 | 6/2019 | Coskrey et al. | |
| 2019/0338762 A1 | 11/2019 | Curry et al. | |
| 2020/0040878 A1 | 2/2020 | Morris et al. | |
| 2020/0049136 A1 | 2/2020 | Stephenson | |
| 2020/0056458 A1 | 2/2020 | Mao et al. | |
| 2020/0109616 A1 | 4/2020 | Oehring et al. | |
| 2020/0116038 A1* | 4/2020 | Saraswathi ............. F01D 25/28 |
| 2020/0325761 A1 | 10/2020 | Williams | |
| 2020/0332784 A1 | 10/2020 | Zhang et al. | |
| 2020/0340344 A1 | 10/2020 | Reckels et al. | |
| 2020/0370633 A1 | 11/2020 | Kumar | |
| 2020/0392826 A1 | 12/2020 | Cui et al. | |
| 2021/0025383 A1 | 1/2021 | Bodishbaugh | |
| 2021/0079902 A1 | 3/2021 | Yeung et al. | |
| 2021/0102531 A1 | 4/2021 | Bodishbaugh et al. | |
| 2021/0372256 A1 | 12/2021 | Yeung et al. | |
| 2021/0381358 A1 | 12/2021 | Yeung | |
| 2021/0404309 A1 | 12/2021 | Yeung et al. | |
| 2022/0259964 A1 | 8/2022 | Zhang | |

FOREIGN PATENT DOCUMENTS

| | | |
|---|---|---|
| CN | 201159100 Y | 12/2008 |
| CN | 201646518 U | 11/2010 |
| CN | 201863895 U | 6/2011 |
| CN | 102136778 A | 7/2011 |
| CN | 102602323 A | 7/2012 |
| CN | 202673269 U | 1/2013 |
| CN | 202763319 U | 3/2013 |
| CN | 202926404 U | 5/2013 |
| CN | 202935216 U | 5/2013 |
| CN | 203962367 U | 11/2014 |

(56) References Cited

FOREIGN PATENT DOCUMENTS

| | | |
|---|---|---|
| CN | 105065224 A | 11/2015 |
| CN | 205117343 U | 3/2016 |
| CN | 105545666 A | 5/2016 |
| CN | 105703535 A | 6/2016 |
| CN | 106089175 A | 11/2016 |
| CN | 107208557 A | 9/2017 |
| CN | 107544304 A | 1/2018 |
| CN | 107939342 A | 4/2018 |
| CN | 208862781 U | 5/2019 |
| CN | 109869294 A | 6/2019 |
| CN | 109882144 A | 6/2019 |
| CN | 109906305 A | 6/2019 |
| CN | 107461253 B | 8/2019 |
| CN | 110118127 A | 8/2019 |
| CN | 110145399 A | 8/2019 |
| CN | 110374745 A | 10/2019 |
| CN | 110469314 A | 11/2019 |
| CN | 110469405 A | 11/2019 |
| CN | 110500255 A | 11/2019 |
| CN | 110513097 A | 11/2019 |
| CN | 209586278 U | 11/2019 |
| CN | 209586287 U | 11/2019 |
| CN | 110735713 A | 1/2020 |
| CN | 110821464 A | 2/2020 |
| CN | 210714958 U | 6/2020 |
| CN | 210985525 A | 7/2020 |
| CN | 111594314 A | 8/2020 |
| CN | 111946504 A | 11/2020 |
| CN | 112343676 A | 2/2021 |
| CN | 112682172 A | 4/2021 |
| DE | 102015213625 A1 | 1/2017 |
| FR | 2890438 A1 | 3/2013 |
| KR | 101861753 B1 | 5/2018 |
| WO | WO 2019/204323 A1 | 10/2019 |

OTHER PUBLICATIONS

International Search Report, dated Jun. 5, 2020, pp. 1-4, issued in International Patent Application No. PCT/CN2019/107020, China Intellectual Property Administration, Beijing, China.
International Search Report, dated Jun. 5, 2020, pp. 1-4, issued in International Patent Application No. PCT/CN2019/107021, China Intellectual Property Administration, Beijing, China.
International Search Report, dated Jun. 5, 2020, pp. 1-4, issued in International Patent Application No. PCT/CN2019/107023, China Intellectual Property Administration, Beijing, China.
International Search Report, dated May 14, 2020, pp. 1-4, issued in International Patent Application No. PCT/CN2019/107026, China Intellectual Property Administration, Beijing, China.
International Search Report, dated Sep. 26, 2021, pp. 1-4, issued in International Patent Application No. PCT/CN2019/095646, China Intellectual Property Administration, Beijing, China.
Ex parte Quayle Office Action mailed May 14, 2024 for U.S. Appl. No. 18/342,318.

* cited by examiner

HYDRAULIC FRACTURING SYSTEM FOR DRIVING A PLUNGER PUMP WITH A TURBINE ENGINE

CROSS REFERENCE

This application is a continuation-in-part application of and claims the benefit of priority of U.S. patent application Ser. No. 17/886,221, filed on Aug. 11, 2022, which is a continuation of and claims the benefit of priority to U.S. patent application Ser. No. 17/544,462, filed on Dec. 7, 2021, which is a continuation of and claims the benefit of priority to the International PCT Application No. PCT/CN2019/107026, filed on Sep. 20, 2019, both entitled "Hydraulic fracturing System for Driving a Plunger Pump with a Turbine Engine." This application is further a continuation-in-part application of and claims the benefit of priority of U.S. patent application Ser. No. 17/396,188, filed on Aug. 6, 2021, which is based on Chinese Patent Application No. CN202110339066.3, filed on Mar. 30, 2021. The above prior applications are herein incorporated by reference in their entireties.

TECHNICAL FIELD

The present invention relates to the technical field of fracturing in oil and gas fields, and specifically to a hydraulic fracturing system for driving a plunger pump with a turbine engine.

BACKGROUND

Hydraulic fracturing has been applied in increasing the production in oil or gas wells for decades. For this process, a plunger pump is used to pump fluid into the wellbore under high pressure, and then the fluid is squeezed into the formation, fracturing several hydraulic fractures. Water, other liquids as well as fracturing proppants are also injected into the fractures. After fracturing, the fracturing base fluid is returned to the ground, with the fracturing proppants remaining in the fracture to prevent fracture closure, through which a large amount of oil and gas enter the wellbore to be exploited.

In the working sites of fracturing in oil and gas fields all over the world, the power driving modes for the plunger pump mainly include the following two ways:

One driving mode is that a diesel engine is connected to a transmission through a transmission shaft to drive the fracturing plunger pump to work. In other words, a diesel engine is used as the power source, a transmission and a transmission shaft are used as the transmission devices, and a plunger pump is used as the actuating element.

This configuration mode has the following disadvantages:
(1) Large volume and heavy weight: When a diesel engine drives a transmission to drive a plunger pump through a transmission shaft, a large volume is occupied, a heavy weight is involved, the transportation is restricted, and the power density is low;
(2) Environmental problems: During operations on a well site, the fracturing equipment driven by the diesel engine would generate engine waste gas pollution and noise pollution. The noise exceeding 105 dBA will severely affect the normal life of nearby residents;
3) Cost inefficiency: The fracturing equipment driven by the diesel engine requires relatively high initial purchase costs and incurs high fuel consumption costs for unit power during operation, and the engine and the transmission also require very high routine maintenance costs.

The other driving mode is that an electric motor is connected to a transmission shaft or a coupling to drive the plunger pump to work. In other words, an electric motor is used as the power source, a transmission shaft or a coupling is used as the transmission device, and a plunger pump is used as the actuating element, i.e., electric drive fracturing.

Although the electric drive fracturing has many advantages itself, it is difficult to supply power for the fracturing well sites in that the power capacity on the well sites is too small to drive the whole fracturing unit, or there are not any power networks at all on the well sites. Therefore, generators have to be used to generate electricity. The most economical generation fuel is natural gas, but the users need to rent or purchase gas generator sets. For a fracturing well site without power networks, the power of the gas generator sets needs up to at least 30 MW. Purchasing such high-power gas generator sets is a great investment for customers. More importantly, in actual work progress, the accidental shutdown of the gas generator sets would cause the breakdown of the whole electric drive fracturing unit, thus seriously affecting the working quality, even causing work accidents.

Therefore, there is an urgent need for a hydraulic fracturing system to meet the current demands.

SUMMARY

To overcome the deficiencies in the prior art, an objective of the present invention is to provide a hydraulic fracturing system for driving a plunger pump with a turbine engine, in which a turbine engine is used to drive the plunger pump to solve the current problems of diesel drive and electric motor drive. The fuel supply of a turbine engine with a dual-fuel system (the turbine engine is fueled by diesel or natural gas) is diverse and not limited, especially when natural gas is used as the fuel, it will save more cost.

The objective of the present invention is achieved by the following technical measures: A hydraulic fracturing system for driving a plunger pump with a turbine engine, including a fracturing equipment, a high-low pressure manifold, a blending equipment and a sand-mixing equipment; the blending equipment is used for blending fracturing base fluid in the hydraulic fracturing system, the sand-mixing equipment provides the fracturing base fluid and a fracturing proppant to the high-low pressure manifold; one end of the high-low pressure manifold is connected to the fracturing equipment through a connection pipeline, the other end of the high-low pressure manifold is connected to a wellhead; a turbine engine is used as the power source of the fracturing equipment, and the turbine engine is fueled by natural gas or diesel.

Further, the turbine engine is fueled by natural gas, the natural gas is delivered to the turbine engine by a CNG tanker through CNG pressure regulating equipment, or delivered to the turbine engine by a LNG tanker through LNG gasification conveying equipment, or accessed through the wellhead gas port and delivered to the turbine engine through wellhead gas treatment equipment, or accessed through the pipeline gas port and delivered to the turbine engine through pipeline gas treatment equipment, the natural gas fuel is supplied in one or more of the above ways.

Further, the hydraulic fracturing system for driving a plunger pump with a turbine engine includes instrumentation which is used for monitoring the entire hydraulic fracturing system.

Further, the fracturing equipment is vehicle-mounted or semi-trailer mounted or skid mounted.

Further, the plunger pump in the fracturing equipment is a three-cylinder pump or a five-cylinder pump, the power of which is 2250 hp or above.

Further, the plunger pump is a five-cylinder pump, the power of which is 5000 hp or above.

Further, the fracturing equipment includes one or more sets of turbine fracturing equipment.

Further, the turbine fracturing equipment includes a turbine engine, an exhaust system and a plunger pump, one end of the turbine engine is connected to the exhaust system, the other end of the turbine engine is connected to the plunger pump, the plunger pump is a plunger pump equipped with a reduction gearbox, the turbine engine is directly connected to an input end of the reduction gearbox on the plunger pump.

Further, the plunger pump, the turbine engine and the exhaust system are disposed in a straight line along the transmission direction of power.

Further, the turbine fracturing equipment includes an exhaust system, a turbine engine, a reduction gearbox, a transmission mechanism and a plunger pump, the exhaust system is connected to an exhaust port of the turbine engine, an output end of the turbine engine is connected to the reduction gearbox, and the reduction gearbox is connected to the plunger pump through the transmission mechanism.

Further, the exhaust system, the turbine engine, the reduction gearbox, the transmission mechanism and the plunger pump are disposed in a straight line along the transmission direction of power.

Compared with the prior art, the present invention has the following beneficial effects: A turbine engine is used to drive the plunger pump to solve the current problems of diesel drive and electric motor drive. The fuel supply of a turbine engine with a dual-fuel system (the turbine engine is fueled by diesel or natural gas) is diverse and not limited, which can be chosen by customers according to the actual situation. Especially when natural gas is used as the fuel, it will save more cost. The supply of natural gas in the whole hydraulic fracturing system is diversified, better meeting the demands of more customers. The entire fracturing equipment is disposed in a straight line along the transmission direction of power, better lowering the overall center of gravity of the fracturing equipment, and increasing the stability and safety of the fracturing equipment both in operation and transportation.

The present invention will be described in detail below with reference to the accompanying drawings and specific implementations.

Wherein, 1. CNG tanker, 2. CNG pressure regulating equipment, 3. natural gas pipeline, 4. turbine fracturing equipment, 5. connection pipeline, 6. high-low pressure manifold, 7. wellhead, 8. wellhead gas port, 9. wellhead gas treatment equipment, 10. sanding vehicle, 11. sand storage tank, 12. sand conveying equipment, 13. liquid storage tank, 14. sand-mixing equipment, 15. blending equipment, 16. chemical additive equipment, 17. instrumentation, 18. plunger pump, 19. turbine engine, 20. exhaust duct, 21. exhaust silencer, 22. transmission mechanism, 23. reduction gearbox, 24. reduction gearbox equipped on the plunger pump. These and other labels are further described in detail below.

DETAILED DESCRIPTION OF THE DISCLOSURE

Figure 1:
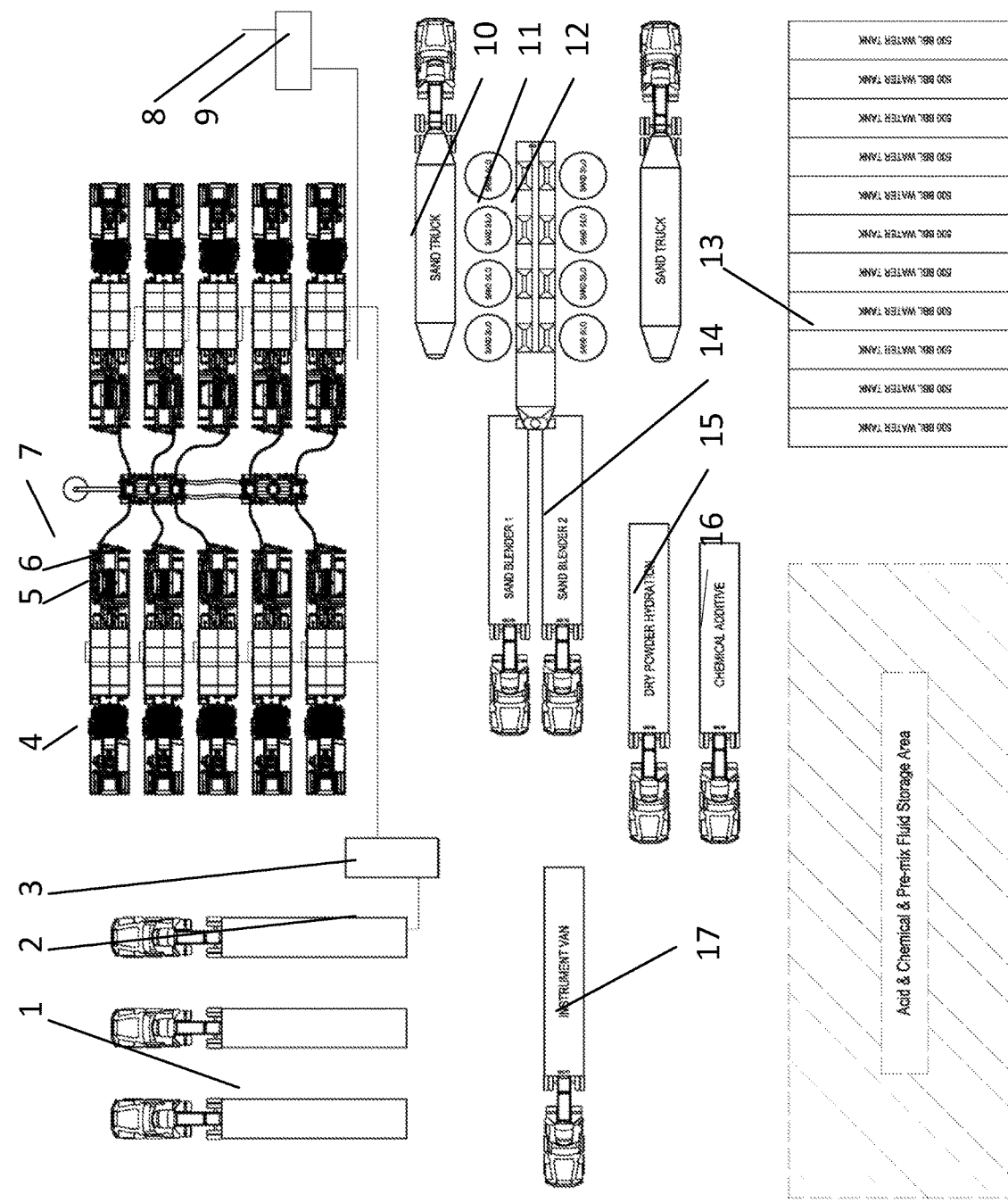
FIG. 1 is a schematic structural diagram of the hydraulic fracturing system of the invention.
Figure 2:
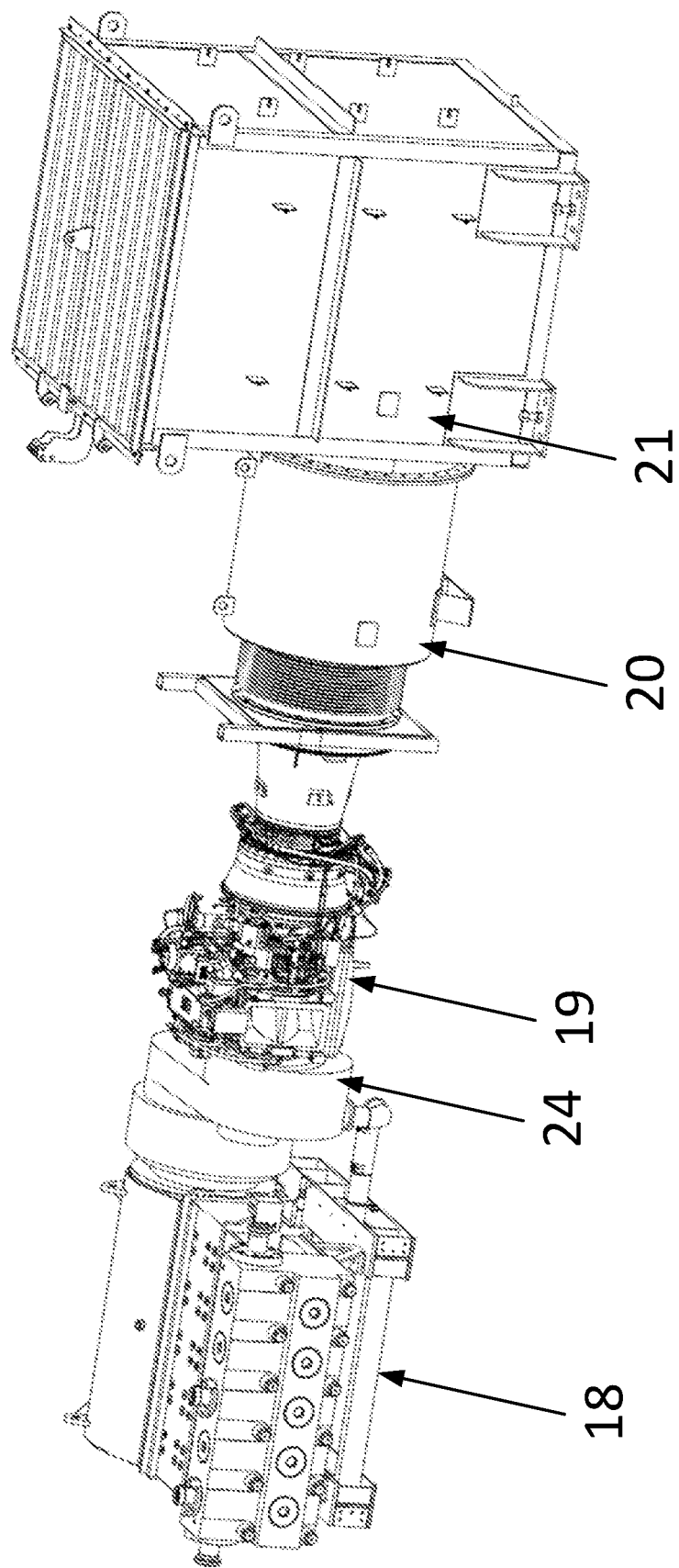
FIG. 2 is a schematic structural diagram of the turbine fracturing equipment of Embodiment 1.
Figure 3:
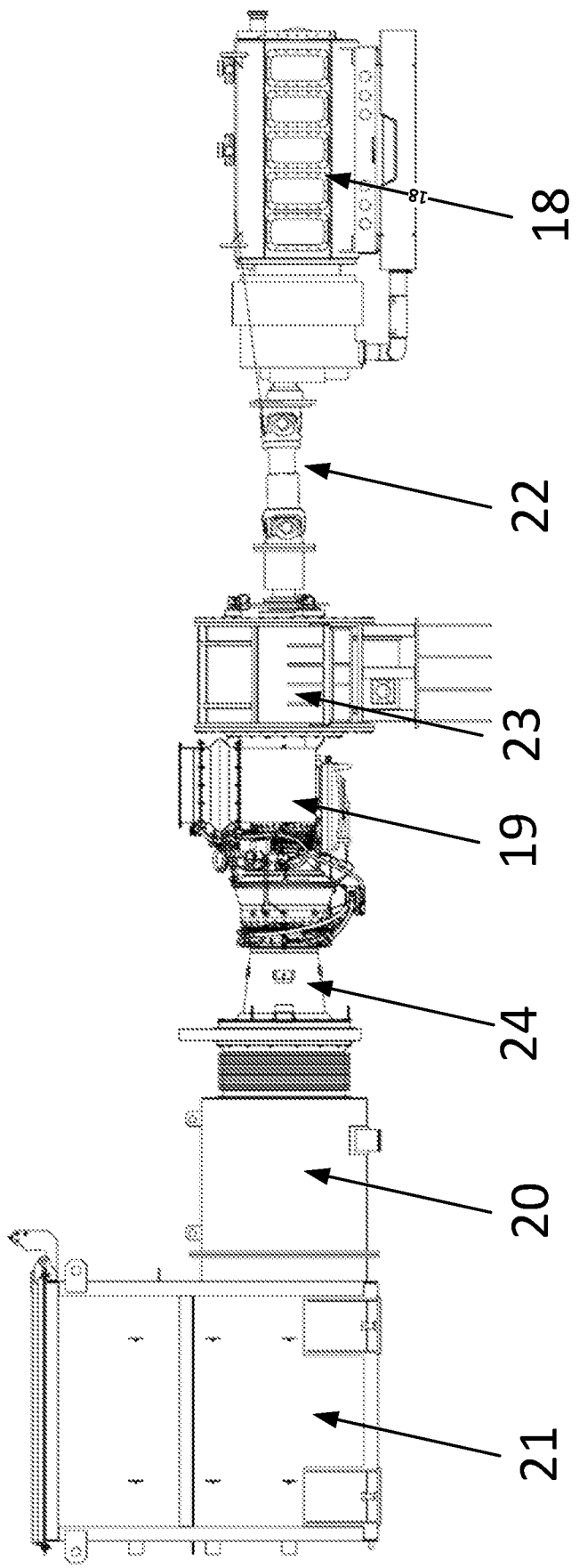
FIG. 3 is a schematic structural diagram of the turbine fracturing equipment of Embodiment 2.

As shown in FIGS. 1 to 3, a hydraulic fracturing system for driving a plunger pump with a turbine engine, including a connection pipeline 5, fracturing equipment, a high-low pressure manifold 6, a blending equipment 15 and a sand-mixing equipment 14; the blending equipment 15 is used for blending fracturing base fluid in the hydraulic fracturing system, the sand-mixing equipment 14 provides the fracturing base fluid and a fracturing proppant to the high-low pressure manifold 6; one end of the high-low pressure manifold 6 is connected to the fracturing equipment through the connection pipeline 5, the other end of the high-low pressure manifold 6 is connected to the wellhead 7; a turbine engine 19 is used as the power source of the fracturing equipment, the plunger pump 18 is driven by the turbine engine 19 with a high power-to-volume ratio and a small occupied area compared to the traditional fracturing equipment with a diesel engine as the power source, greatly reducing the number and occupied area of fracturing units in the entire fracturing equipment. The turbine engine 19 is fueled by natural gas or diesel. The turbine engine 19 with a dual-fuel system can be fueled by 100% fuel oil or 100% natural gas. The fuel supply is diverse so that customers can choose according to the actual situation. Especially when natural gas is used as the fuel, it will save more cost. In the working site of the hydraulic fracturing system, there are further provided with a sanding vehicle 10, a sand storage tank 11, sand conveying equipment 12, a liquid storage tank 13, and chemical additive equipment 16, wherein the liquid storage tank 13 provides water for the blending equipment 15, water and various additives are blended in the blending equipment 15 to form fracturing base fluid, which is then supplied to the sand-mixing equipment 14. A fracturing proppant is transported to the wellsite by the sanding vehicle 10 and conveyed into the sand storage tank 11. There may be multiple sanding vehicles 10. The fracturing proppant is conveyed to the sand-mixing equipment 14 from the sand storage tank 11 by sand conveying equipment 12. The fracturing base fluid and the fracturing proppant are mixed in the sand-mixing equipment 14 and then conveyed into the high-low pressure manifold 6, through which are distributed to each set of turbine fracturing equipment 4, and then the mixed fracturing liquid is injected into the wellhead 7 by a high pressure pump (injection path: turbine fracturing equipment 4—connection pipeline 5—high-low pressure manifold 6—wellhead 7), and then the formation of the oil well or gas well is fractured. The chemical additive equipment 16 is used to supply various chemical additives to the blending equipment 15 or the sand-mixing equipment 14.

In the operation site of the hydraulic fracturing system, a variety of relevant corollary equipment for natural gas supply can be arranged, such as CNG tanker 1, CNG pressure regulating equipment 2, wellhead gas port 8, wellhead gas treatment equipment 9 and the like. Of course, the CNG can be correspondingly replaced with LNG. For example, a combination of an LNG tanker and LNG gasification conveying equipment. Similarly, wellhead gas can also be replaced with pipeline gas, for example, a combination of a pipeline gas port and pipeline gas treatment equipment, and the like.

Specifically, when the turbine engine 19 is fueled by natural gas, the natural gas is regulated by the CNG pressure regulating equipment 2 on the CNG tanker 1, and then delivered to the turbine engine 19 through the natural gas pipeline 3; or gasified by the LNG gasification conveying equipment on the LNG tanker, and then delivered to the turbine engine 19 through the natural gas pipeline 3; or accessed through the wellhead gas port 8 and treated by the wellhead gas treatment equipment 9, and then delivered to the turbine engine 19 through the natural gas pipeline 3; or accessed through the pipeline gas port and treated by the pipeline gas treatment equipment, and then delivered to the turbine engine 19 through the natural gas pipeline 3, the natural gas fuel is supplied in one or more of the above ways. The supply of natural gas in the whole hydraulic fracturing system is diversified, better meeting the demands of more customers. There may be multiple CNG tankers 1 or/and LNG tankers.

The hydraulic fracturing system for driving a plunger pump with a turbine engine includes instrumentation 17 which is used for monitoring the entire hydraulic fracturing system.

The fracturing equipment is vehicle-mounted or semi-trailer mounted or skid mounted.

The plunger pump 18 in the fracturing equipment is a three cylinder pump or a five cylinder pump, the power of which is 2250 hp or above.

The plunger pump 18 is a five cylinder pump, the power of which is 5000 hp or above.

The fracturing equipment includes one or more sets of turbine fracturing equipment 4.

Turbine Fracturing Equipment Embodiment 1

The turbine fracturing equipment 4 is vehicle-mounted or semi-trailer mounted or skid mounted. The diagram and description shown in this embodiment is a schematic structural diagram of the up-loading components of the turbine fracturing equipment 4 after removing the vehicle or semi-trailer or skid.

The turbine fracturing equipment 4 includes a turbine engine 19, an exhaust system and a plunger pump 18, wherein one end of the turbine engine 19 is connected to the exhaust system, the other end of the turbine engine 19 is connected to the plunger pump 18. The plunger pump 18 is a plunger pump 18 integrated with a reduction gearbox, the turbine engine 19 is directly connected to an input end of the reduction gearbox 24 integrated on the plunger pump. An input speed of the reduction gearbox 24 integrated on the plunger pump matches an output speed of the turbine engine 19, and an input torque of the reduction gearbox 24 integrated on the plunger pump matches an output torque of the turbine engine 19, thus simplifying the transmission device between the plunger pump 18 and the turbine engine 19, that is, a transmission shaft or a coupling is omitted, greatly shortening the total length of the turbine fracturing equipment 4, with a simple structure and convenient for maintenance. The exhaust system includes an exhaust duct 20 and an exhaust silencer 21, one end of the exhaust duct 20 is connected to the exhaust silencer 21, the other end of the exhaust duct 20 is connected to an exhaust port of the turbine engine 19. The term "match" as used in this disclosure does not require exact match. Rather, the term "match" is used to indicate compatibility, which accommodate at least a reasonable range, as understood by a person of ordinary skill in the art.

The plunger pump 18, the turbine engine 19 and the exhaust system are disposed in a straight line along the transmission direction of power, to avoid excessive transmission loss, thus ensuring the efficient transmission performance of the equipment, better lowering the overall center of gravity of the turbine fracturing equipment 4, and increasing the stability and safety of the turbine fracturing equipment 4 both in operation and transportation. In some implementations, the turbine engine may have multiple axes of rotation. Likewise, the gearbox and the plunger pump may each have multiple rotational or driving axes. The term axes as a plural form of the term "axis" may refer to a rotational shaft, or a virtual rotation center that may not correspond to any shaft. The plunger pump, the turbine engine, and the gear box are in straight line when any of the axes of these components are in disposed in a straight line.

Turbine Fracturing Equipment Embodiment 2

The turbine fracturing equipment 4 is vehicle-mounted or semi-trailer mounted or skid mounted. The diagram and description shown in this embodiment is a schematic structural diagram of the up-loading components of the turbine fracturing equipment 4 after removing the vehicle or semi-trailer or skid.

The turbine fracturing equipment 4 includes an exhaust system, a turbine engine 19, a reduction gearbox 23, a transmission mechanism 22 and a plunger pump 18, wherein the exhaust system is connected to an exhaust port of the turbine engine 19, an output end of the turbine engine 19 is connected to the reduction gearbox 23, and the reduction gearbox 23 and the plunger pump 18 are connected through a transmission mechanism 22. The exhaust system includes an exhaust duct 20 and an exhaust silencer 21, one end of the exhaust duct 20 is connected to the exhaust silencer 21, the other end of the exhaust duct 20 is connected to the exhaust port of the turbine engine 19.

The exhaust system, the turbine engine 19, the reduction gearbox 23, the transmission mechanism 22 and plunger pump 18 are disposed in a straight line along the transmission direction of power, to avoid excessive transmission loss, thus ensuring the efficient transmission performance of the equipment, better lowering the overall center of gravity of the turbine fracturing equipment 4, and increasing the stability and safety of the turbine fracturing equipment 4 both in operation and transportation. The transmission mechanism 22 is a transmission shaft or a coupling.

The turbine engine 19 itself has the advantages of small volume and light weight, greatly decreasing the volume and weight of the turbine fracturing equipment 4.

As shown in FIG. 3, in some implementations, a diffusion device 24 as part of the exhaust system of the turbine engine may be implemented. The diffusion device 24 may be disposed between the exhaust side of the turbine engine and the exhaust duct 20 and silencer 21. In some implementations, the diffusion device 24 may function also as part of the exhaust duct and be directly coupled to a silencer.

Figure 4:
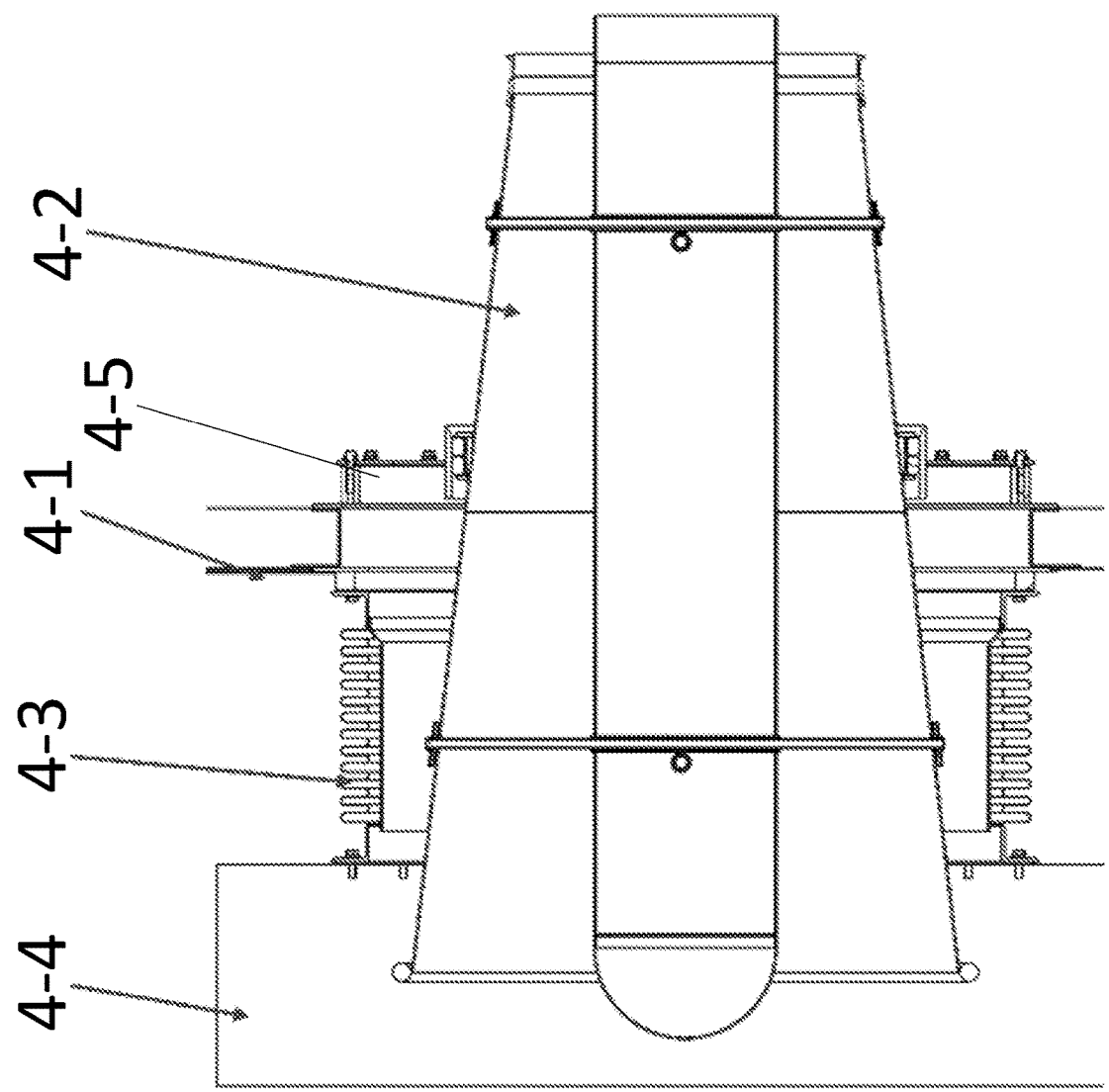
FIG. 4 is a schematic diagram of a diffusion device.

For example, FIG. 4 shows a schematic diagram of an implementation for the diffusion device 24, the exhaust duct 20 and the silencer 21 of FIG. 3, the example implementation including a diffusion pipe 4-2 and a silencer 4-4. As illustrated in FIG. 4, the fracturing apparatus has a cabin side wall 4-1 that enclose the turbine engine and other components, and a diffusion pipe 4-2 is arranged on the cabin side wall 4-1. One end of the diffusion pipe 4-2 passes through a corrugated pipe 4-3 and communicates with the silencer 4-4, and the other end of the diffusion pipe 4-2 communicates with the turbine (not illustrated in FIG. 4). In the process of installing the diffusion pipe 4-2 to the cabin side wall 4-1, because the diffusion pipe 4-2 is heavy and bulky, and seal connection between the diffusion pipe 4-2 and the cabin side wall 4-1 is soft, it is very difficult to adjust the diffusion pipe 4-2 to be coaxial with the turbine and fix the diffusion pipe 4-2 to the cabin side wall 4-1, which often requires multiple workers to assist in the installation process. For example, after adjusting the diffusion pipe 4-2 to be coaxial with the turbine, it may be necessary to fix a fixation plate 4-5 of the diffusion pipe 4-2 on the cabin side wall 4-1 by welding or bolting, so as to complete the assembly of the diffusion pipe 4-2, this assembly process is difficult, costs excessive manpower and wastes time.

At least one embodiment of the present disclosure provides an exhaust device, the exhaust device includes a body, a fixation plate, a pressure plate, and a diffusion pipe; the body includes a side wall; the fixation plate is configured to be fixed to the side wall; the pressure plate is configured to be able to be pre-fixedly connected and fixedly connected with the fixation plate; the diffusion pipe is configured to be fixed to the side wall through the pressure plate and the fixation plate; the fixation plate further includes a first pre-installation part, and the pressure plate further includes a second pre-installation part, and the second pre-installation part is matched with the first pre-installation part to realize pre-fixation of the diffusion pipe. In an assembly process of the exhaust device, the first pre-installation part of the fixation plate and the second pre-installation part of the pressure plate can realize pre-fixation of the diffusion pipe by matching with each other, and then the diffusion pipe can be fixed, so that initial alignment between the diffusion pipe and other components (such as turbines) can be realized by the pre-fixation, and then the diffusion pipe can be accurately connected by fixing. This process introduces the pre-fixation, so in the subsequent alignment and fixing process, no manpower is needed to support the diffusion pipe, and no manpower is needed to align the diffusion pipe. Therefore, although the pre-fixation process is added, in fact, the assembly process is simplified, manpower and time are saved, and the assembly efficiency is improved.

The exhaust device and an installation method thereof and a turbine fracturing apparatus provided by embodiments of the present disclosure are further described in detail below by several specific examples below.

Figure 5:
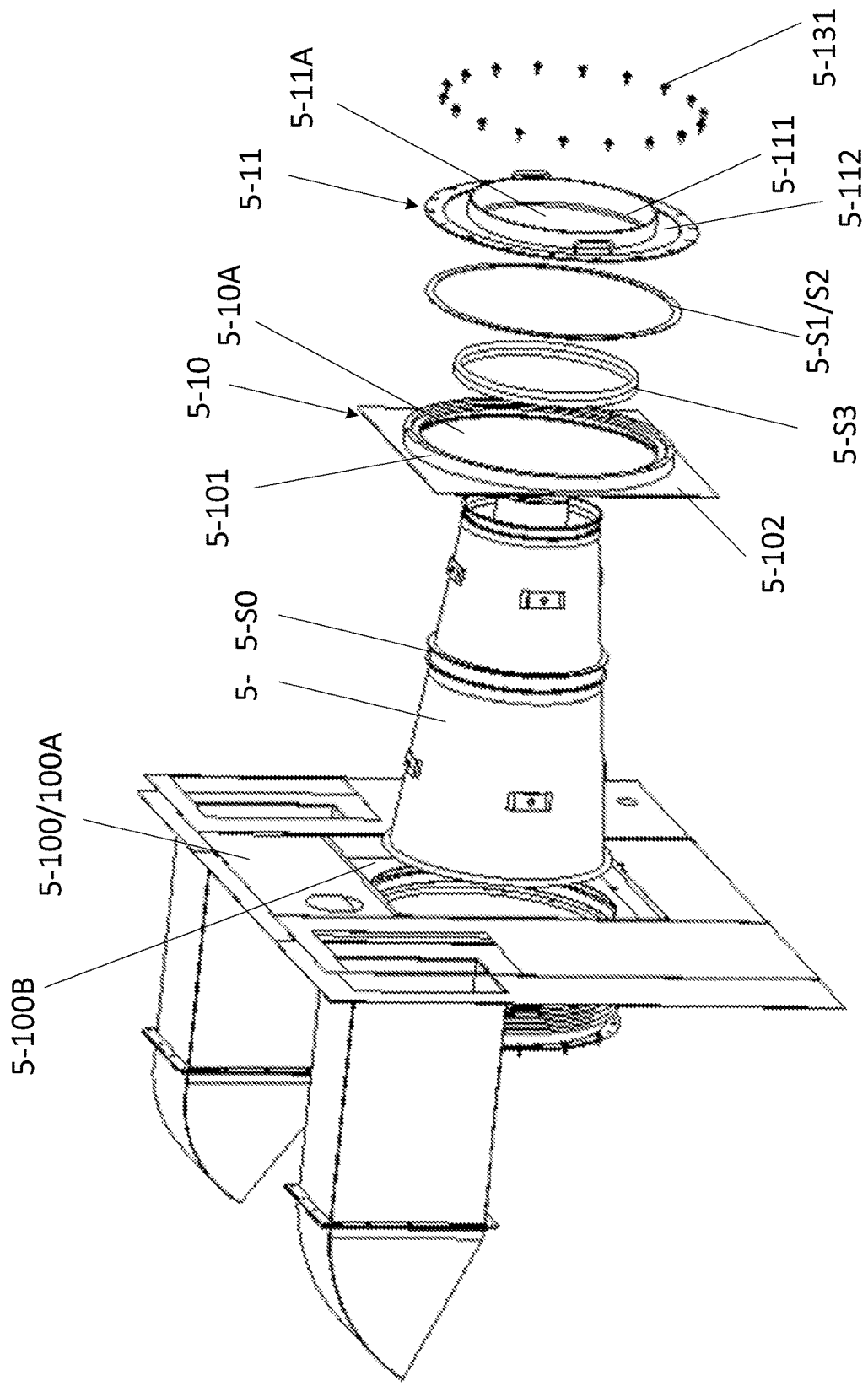
FIG. 5 is an exploded diagram of a diffusion device provided by at least one embodiment of the present disclosure.

At least one embodiment of the present disclosure provides an exhaust device, and FIG. 5 shows a diagram of the example exhaust device. As illustrated in FIG. 5, the exhaust device includes a body 5-100, a fixation plate 5-10, a pressure plate 5-11 and a diffusion pipe 5-S; the body 5-100 includes a side wall 5-100A; the fixation plate 5-10 is configured to be fixed to the side wall 5-100A; the pressure plate 5-11 is configured to be pre-fixedly connected and fixedly connected with the fixation plate 5-10; the diffusion pipe 5-S is configured to be fixed to the side wall 5-100A by the pressure plate 5-11 and the fixation plate 5-10.

For example, in some embodiments of the present disclosure, the body 5-100, the fixation plate 5-10, the pressure plate 5-11 and the diffusion pipe 5-S may be in a state to be assembled or in an assembled state.

Figure 6:
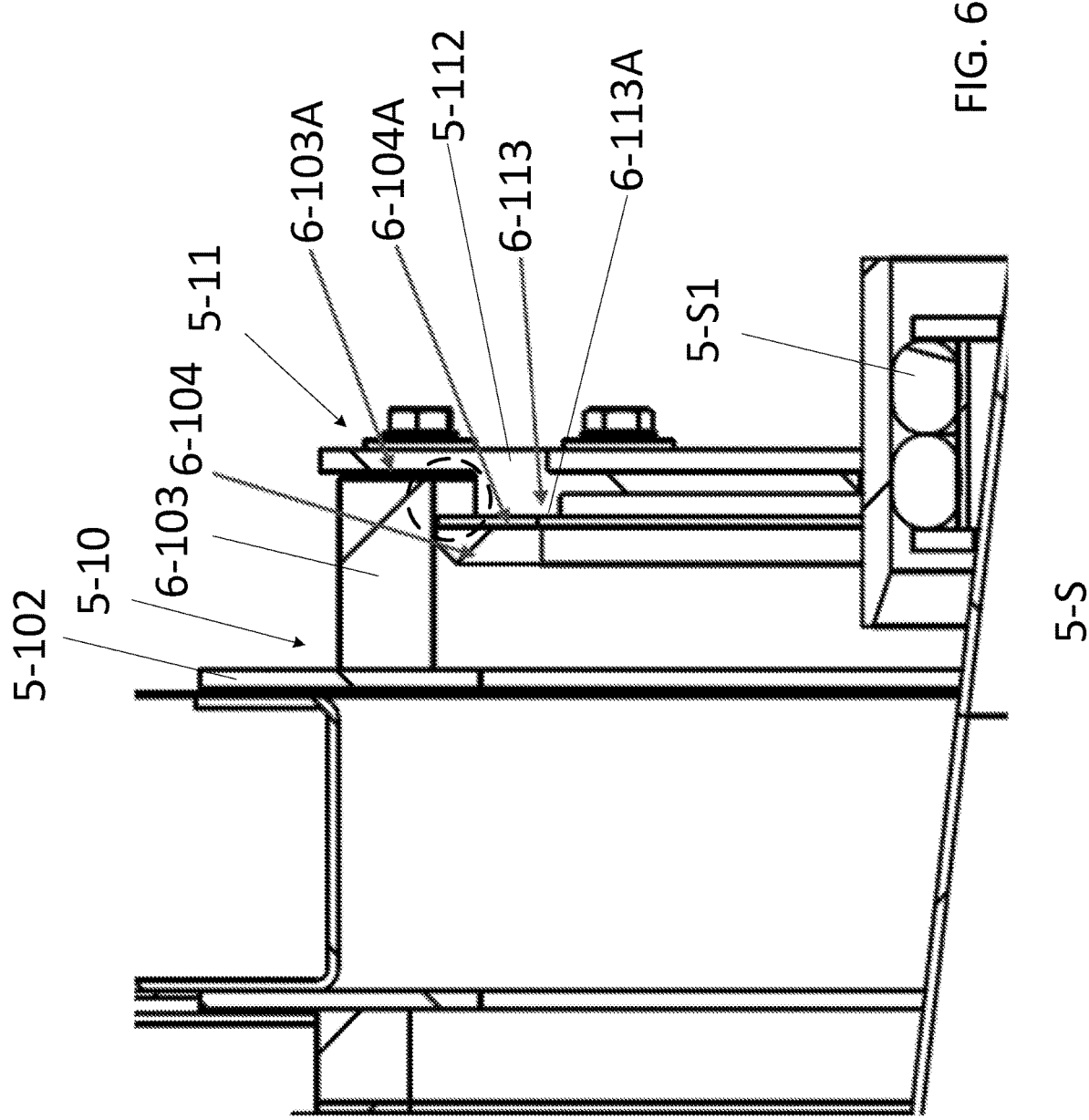
FIG. 6 is an enlarged schematic diagram of a part of the diffusion device in FIG. 5 after assembly of the diffusion device.

For example, FIG. 6 shows a schematic cross-sectional diagram of a part of the exhaust device in FIG. 5 in the upper dashed frame region after assembly of the exhaust device. As illustrated in FIG. 5 and FIG. 6, the fixation plate 5-10 further includes a first pre-installation part 5-101, and the pressure plate 5-11 further includes a second pre-installation part 5-111, and the second pre-installation part 5-111 and the first pre-installation part 5-101 may be matched with each other to realize pre-fixation of the diffusion pipe 5-S. For example, the match and cooperation between the second pre-installation part 5-111 and the first pre-installation part 5-101 may include match connection such as plugging connection, lap joint connection, clamping connection, and so on, and the embodiments of the present disclosure do not specifically limit the match mode between the second pre-installation part 5-111 and the first pre-installation part 101.

For example, in some embodiments, the second pre-installation part 5-111 and the first pre-installation part 5-101 are configured to realize the pre-fixation of the diffusion pipe 5-S by plugging with each other. For example, one of the second pre-installation part 5-111 and the first pre-installation part 5-101 includes a concave part, and the other one of the second pre-installation part 5-111 and the first pre-installation part 5-101 includes a convex part. In a case that the second pre-installation part 5-111 and the first pre-installation part 5-111 are plugged with each other, at least a part of the convex part is located in the concave part, thereby realizing the pre-fixation of the diffusion pipe 5-S.

For example, as illustrated in FIG. 5, the side wall 5-100A has an installation opening 5-100B, the fixation plate 5-10 has a first opening 5-10A configured for the diffusion pipe 5-S to pass through, and the pressure plate 5-11 has a second opening 5-11A configured for the diffusion pipe 5-S to pass through; the diffusion pipe 5-S is configured to pass through the installation opening 5-100B, the first opening 5-10A and the second opening 5-11A to be fixed on the side wall 5-100A. For example, a middle portion 5-S0 of the diffusion pipe 5-S0 is configured as a portion fixed to the side wall 5-100A.

For example, in some embodiments, as illustrated in FIG. 5 and FIG. 6, the fixation plate 5-10 may include a first plate surface 5-102, and the first pre-installation part 5-101 includes a first installation part 6-103 protruding from the first plate surface 5-102 in an axial direction (i.e., the horizontal direction in the figure), and the first installation part 6-103 at least partially surrounds the first opening 5-10A. As illustrated in FIG. 6, the first pre-installation part 5-10 further includes a first baffle 6-104 protruding from a side of the first installation part 6-103 to the first opening 5-10A, the side of the first installation part 5-10 faces the first opening 5-10A, and the first baffle 6-104 is spaced apart from a first surface 6-103A of the first installation part 6-103 by a predetermined distance, and the first surface 6-103A of the first installation part 6-103 is spaced apart from the first plate surface 5-102 in the axial direction, so that the first pre-installation part 5-101 is configured as the concave part for plugging connection, and at least a part of the concave part is defined by the first baffle 6-104 and the first installation part 6-103, that is, the part illustrated in the dash circle in FIG. 6.

For example, in the case that the first pre-installation part 5-101 is matched with the second pre-installation part 5-111, the first surface 6-103A of the first installation part 6-103 faces at least a part of the pressure plate 5-11. For example, a seal ring may be provided between the first surface 6-103A and the pressure plate 5-11 for sealing the fixation plate 5-10 and the pressure plate 5-11.

For example, in some embodiments, as illustrated in FIG. 5 and FIG. 6, the pressure plate 5-11 may include a second plate surface 5-112, and the second pre-installation part 5-111 includes a first convex part 6-113 protruding from the second plate surface 5-112 in the axial direction (i.e., the horizontal direction in the figure), and the first convex part 6-113 at least partially surrounds the second opening 5-11A. In the case that the first pre-installation part 5-101 is matched with the second pre-installation part 5-111, a second surface 6-113A of the first convex part 6-113 faces a third surface 6-104A of the first baffle 6-104, the second surface 6-113A is spaced apart from the second plate surface 5-112 in the axial direction. For example, a seal ring may be provided between the second surface 6-113A and the third surface 6-104A of the first baffle 6-104 for sealing the fixation plate 5-10 and the pressure plate 5-11.

For example, in the case that the first pre-installation part 5-101 is matched with the second pre-installation part 5-111, as illustrated in FIG. 6, at least a part of the first convex part 6-113 is located in the concave part defined by the first baffle 6-104 and the first installation part 6-103, and in this case, the third surface 6-104A of the first baffle 6-104 serves as at least a part of a bottom surface of the concave part.

For example, in some embodiments, the first installation part 6-103 is a first closed annular structure surrounding the first opening 5-10A, and the first convex part 6-113 is a second closed annular structure surrounding the second opening 5-11A. In the case that the first pre-installation part is matched with the second pre-installation part, the second closed annular structure is located radially inside the first closed annular structure, that is, in this embodiment, the first pre-installation part 5-101 includes a concave part defined by the first baffle 6-104 and the first installation part 6-103, and the second pre-installation part 5-111 includes a convex part defined by the first convex part 6-113. In the case that the first pre-installation part is matched with the second pre-installation part, at least a part of the second pre-installation part 5-111 (e.g., the convex part defined by the first convex part 6-113) is inserted into the first pre-installation part (e.g., the concave part defined by the first baffle 6-104 and the first installation part 6-103), so as to realize the plugging connection, thereby realizing the pre-fixation of the diffusion pipe.

For example, in some embodiments, as illustrated in FIG. 5 and FIG. 6, the exhaust device may further include a first seal part 5-S1 between the first surface 6-103A and the pressure plate 5-11 and/or a second seal part 5-S2 between the second surface 6-113A and the first baffle 6-104, so as to seal the fixation plate 5-10 and the pressure plate 5-11. For example, in specific implementation, the exhaust device may include only the first seal part 5-S1 between the first surface 6-103A and the pressure plate 5-11, or include only the second seal part 5-S2 between the second surface 6-113A and the first baffle 6-104, or include both the first seal part 5-S1 and the second seal part 5-S2, the embodiments of the present disclosure are not limited in this aspect.

For example, as illustrated in FIG. 5 and FIG. 6, the exhaust device may further include a third seal part 5-S3, the third seal part 5-S3 may be disposed between the fixation plate 5-10 and the diffusion pipe 5-S for sealing the fixation plate 5-10 and the diffusion pipe 5-S.

Figure 7:
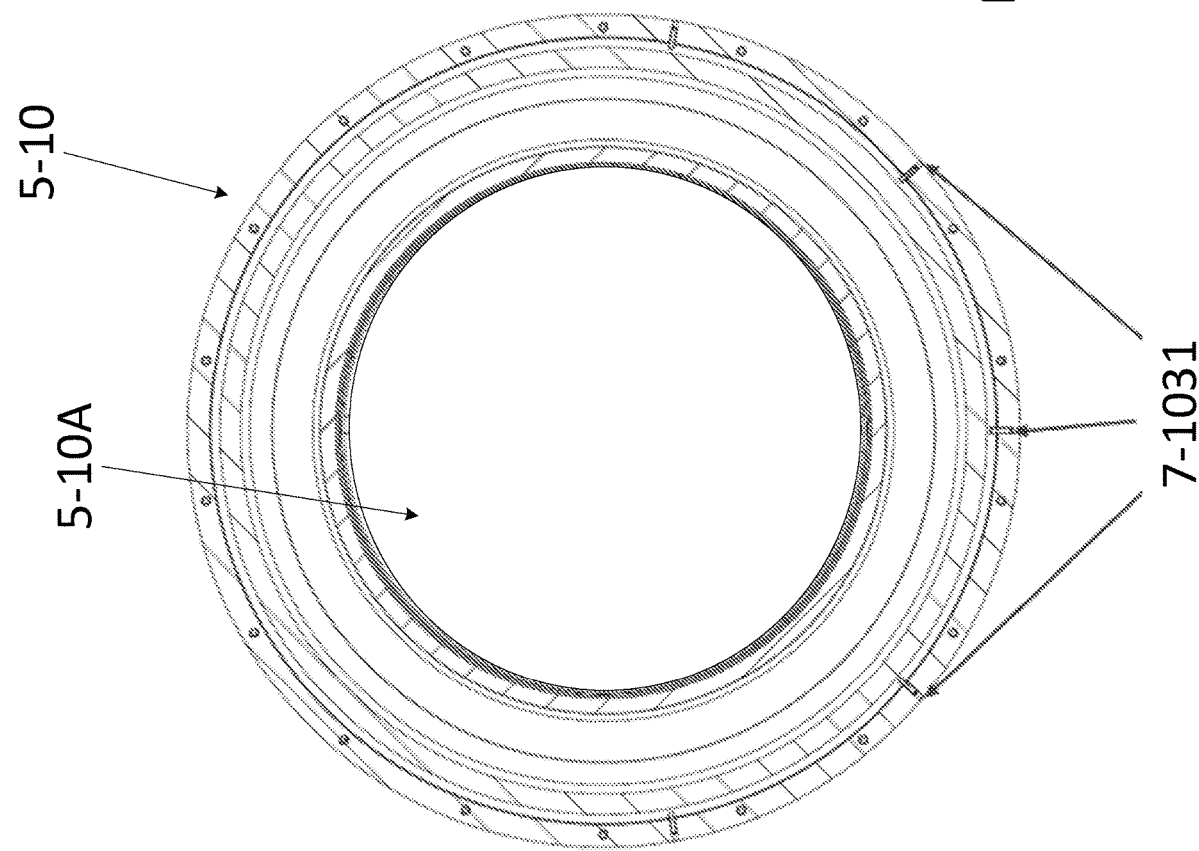
FIG. 7 is a schematic planar diagram of a fixation plate of the diffusion device provided by at least one embodiment of the present disclosure.
Figure 8:
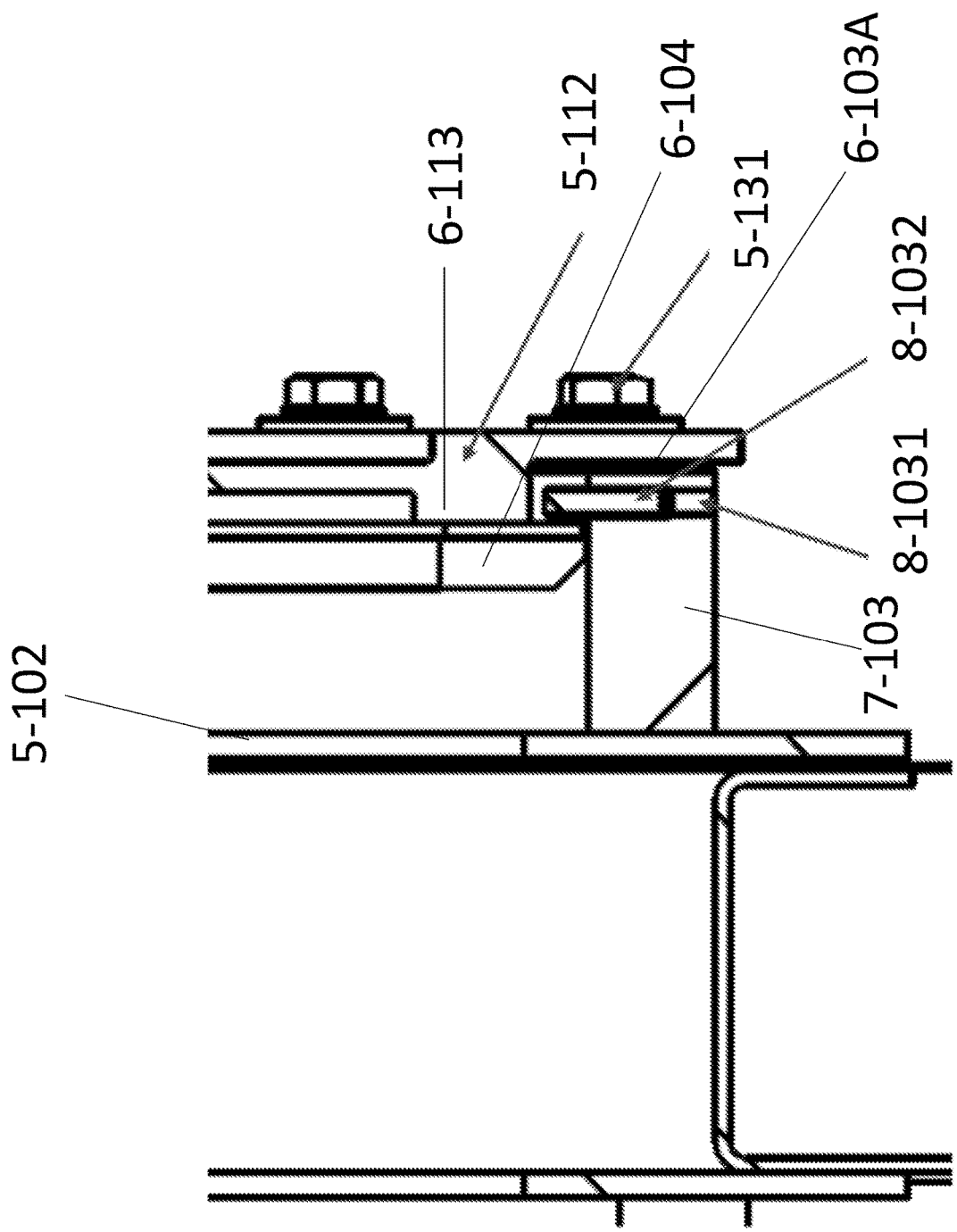
FIG. 8 is an enlarged schematic diagram of another part of the diffusion device in FIG. 2 after assembly of the diffusion device.

For example, FIG. 7 shows a schematic planar diagram of the fixation plate, and FIG. 8 shows a schematic cross-sectional diagram of a part of the exhaust device in FIG. 5 in the lower dashed frame region after assembly of the diffusion device. For example, in some embodiments, the first installation part 6-103 has at least one threaded hole 7-1031 which extends in a direction parallel to the first plate surface 5-102 (the vertical direction in FIG. 8) and communicates with the first opening 5-10A, and the at least one threaded hole 7-1031 is located between the first baffle 6-104 and the first surface 6-103A of the first installation part 6-103 in a direction perpendicular to the first plate surface 5-102 (the horizontal direction in FIG. 8), as illustrated in FIG. 8.

For example, a top thread 8-1032 can be screwed into the at least one threaded hole 7-1031. In this case, the top thread 8-1032 can abut against the first convex part 6-113 on the pressure plate 5-11, so as to realize fine adjustment of the position of the pressure plate 5-11, and further to realize fine adjustment of the diffusion pipe 5-S.

For example, as illustrated in FIG. 7, the at least one threaded hole 7-1031 include a plurality of threaded holes 7-1031, and the plurality of threaded holes 7-1031 may surround the first opening 5-10A. For example, in some examples, the plurality of threaded holes 7-1031 may surround the first opening 5-10A in a circle shape; or, the plurality of threaded holes 7-1031 may surround the first opening 5-10A in a half of a circle shape at a lower side of the first opening 5-10A (the case illustrated in FIG. 7). Because at the lower side of the first opening 5-10A, the fixation plate 5-10 bears the weight of the diffusion pipe 5-S, fine adjustment of the position of the diffusion pipe 5-S can be achieved at least in the direction of gravity by setting the threaded hole 7-1031 and the top thread 8-1032 at the lower side of the first opening 5-10A, thereby achieving the effect of accurately installing the diffusion pipe 5-S.

In the assembling process of the exhaust device provided by the embodiments of the present disclosure, the first pre-installation part 5-101 of the fixation plate 5-10 and the second pre-installation part 5-111 of the pressure plate 5-11 can pre-fix the diffusion pipe 5-S by cooperating with (or matching with) each other, so as to realize the initial alignment of the diffusion pipe 5-S with other components (such as the turbine), and then the diffusion pipe 5-S is fixed, for example, the fixation plate 5-10 and the pressure plate 5-11 are fixedly connected by a bolt 5-131, as illustrated in FIG. 5 and FIG. 8. Therefore, the diffusion pipe can be accurately connected by pre-fixation and then fixing. This process can simplify the assembly process, save manpower and time, and improve the assembly efficiency. Furthermore, it is also possible to adjust the position of the diffusion pipe 5-S by the top thread, and then fix the diffusion pipe after adjusting the diffusion pipe to an appropriate position, thereby improving the assembly efficiency and assembly accuracy.

For example, in some embodiment, the first pre-installation part 5-101 on the fixation plate 5-10 and the second pre-installation part 5-111 on the pressure plate 5-11 may also adopt different structures from the above embodiments.

Figure 9:
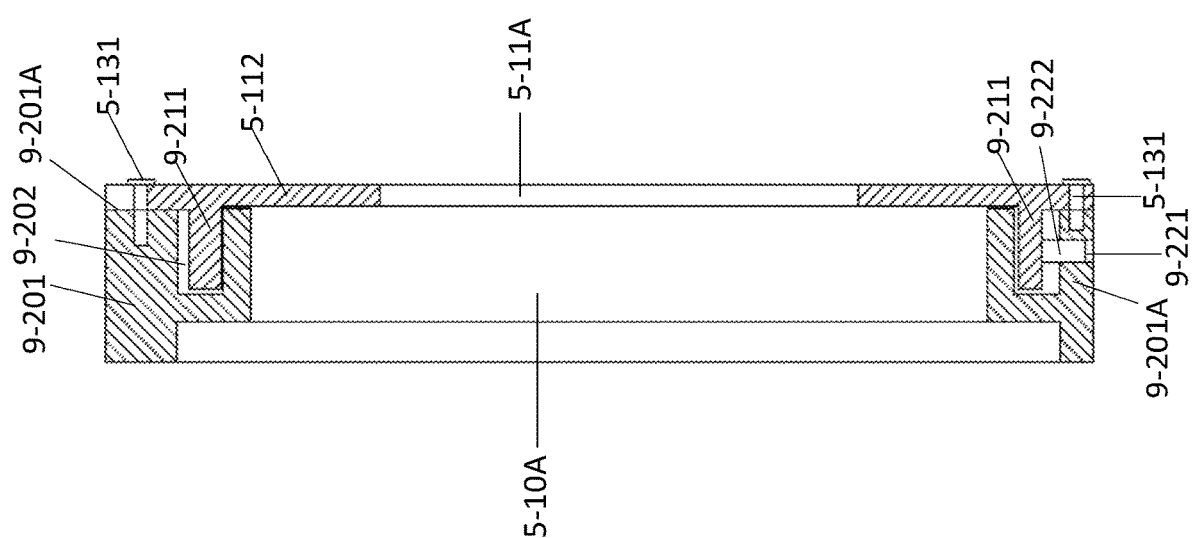
FIG. 9 is a schematic cross-sectional diagram of a first pre-installation part of a fixation plate and a second pre-installation part of a pressure plate in a match state in a diffusion device provided by at least one embodiment of the present disclosure.

For example, FIG. 9 shows another schematic cross-sectional diagram of the cooperation between the first pre-installation part and the second pre-installation part provided by at least one embodiment of the present disclosure. Referring to FIG. 8 and FIG. 9, in this embodiment, the fixation plate 5-10 includes a first plate surface 5-101, the first pre-installation part 5-101 includes a second installation part 9-201 protruding from the first plate surface 5-102 in the axial direction, and the second installation part 9-201 at least partially surrounds the first opening 5-10A, a surface 9-201A of the second installation part 9-201 includes a groove 9-202 extending toward the first plate surface 5-101 in a direction perpendicular to the first plate surface 5-101 (the horizontal direction in the figure), the surface 9-201A is spaced apart from the first plate surface 5-101 in the axial direction, and the groove 9-202 is configured to accommodate at least a part of a convex part (for example, the second convex part 9-211 described later).

For example, with reference to FIG. 5 and FIG. 9, the pressure plate 5-11 includes a second plate surface 5-112, and the second pre-installation part 5-111 includes a second convex part 9-211 protruding from the second plate surface 5-112 in an axial direction, and the second convex part 9-211 at least partially surrounds the second opening 5-11A and is configured to be insertable into the groove 9-202, so that at least a part of the second convex part 9-211 can be located in the groove 9-202 of the second installation part 9-201 to realize the plugging connection of the first pre-installation part and the second pre-installation part.

For example, in some embodiments, the second installation part 9-201 is a first closed annular structure surrounding the first opening 5-10A, and the second convex part 9-211 is a second closed annular structure surrounding the second opening 5-11A. In this embodiment, the first pre-installation part 5-101 includes a concave part defined by the groove 9-202 of the second installation part 9-201, and the second pre-installation part 5-111 includes a convex part defined by the second convex part 9-211. In the case that the first pre-installation part is matched with the second pre-installation part, at least a part of the second pre-installation part 5-111 (e.g., the second convex part 9-211) is inserted into the first pre-installation part (e.g., the groove 9-202 of the second installation part 9-201), so as to realize the plugging connection and further realize the pre-fixation of the diffusion pipe.

For example, as illustrated in FIG. 9, the first side wall 9-201A of the second installation part 9-201, which is away from the first opening 5-10A in the radial direction (the vertical direction in the figure), has at least one threaded hole 9-221 which extends in the direction parallel to the second plate surface 5-111 (the vertical direction in the figure) and penetrates through the first side wall 9-201A.

For example, a top thread 9-222 can be screwed into the at least one threaded hole 9-221, and the top thread 9-222 can abut against the second convex part 9-211 on the pressure plate 5-11, so as to realize fine adjustment of the position of the pressure plate 5-11 and further to realize fine adjustment of the diffusion pipe 5-S.

For example, similar to the case illustrated in FIG. 7, the at least one threaded hole 9-221 may include a plurality of threaded holes 9-221, and the plurality of threaded holes 9-221 may surrounds the first opening 5-10A. For example, in some examples, the plurality of threaded holes 9-221 may surround the first opening 5-10A in a circle shape; or, the plurality of threaded holes 7-1031 may surround the first opening 5-10A in a half of a circle shape at a lower side of the first opening 5-10A. Because at the lower side of the first opening 5-10A, the fixation plate 5-10 bears the weight of the diffusion pipe 5-S, fine adjustment of the position of the diffusion pipe 5-S can be achieved at least in the direction of gravity by arranging the threaded hole 9-221 and the top thread 9-222 at a lower side of the first opening 5-10A, thereby achieving the effect of accurately installing the diffusion pipe 5-S.

Similarly, in the assembling process of the exhaust device provided by the embodiments of the present disclosure, the first pre-installation part 5-101 of the fixation plate 5-10 and the second pre-installation part 5-111 of the pressure plate 5-11 can pre-fix the diffusion pipe 5-S by cooperating with (matching with) each other, so as to realize the initial alignment between the diffusion pipe 5-S and other components (such as the turbine), and then the diffusion pipe 5-S can be fixed, for example, the fixation plate 5-10 and the pressure plate 5-11 are fixedly connected by the bolt 5-131, as illustrated in FIG. 5 and FIG. 9, and in this way, the diffusion pipe can be accurately connected by pre-fixation and then fixing, which can simplify the assembly process, save manpower and time, and improve assembly efficiency.

Figure 10:
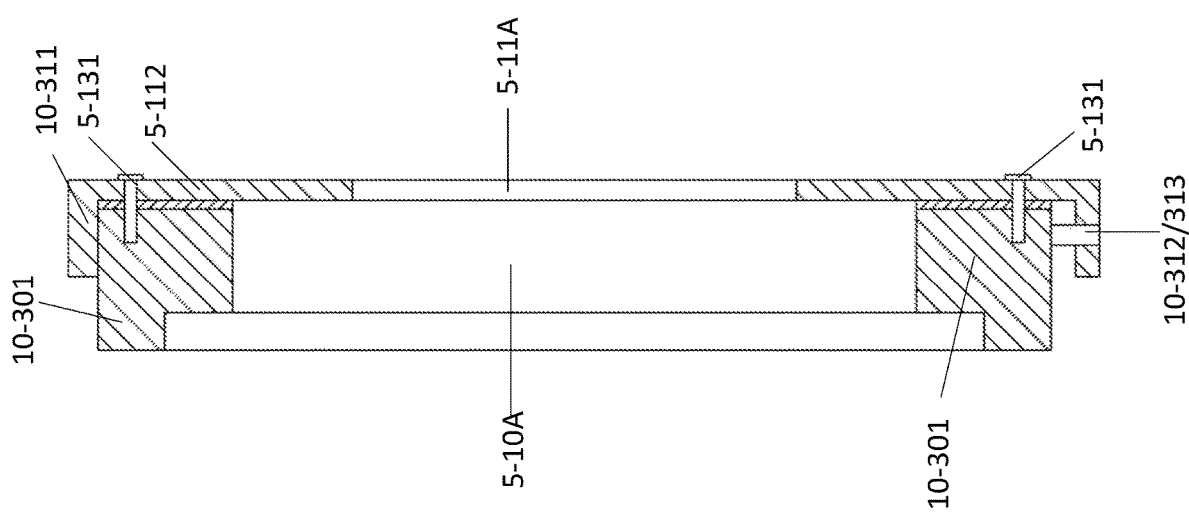
FIG. 10 is another schematic cross-sectional diagram of a first pre-installation part of a fixation plate and a second pre-installation part of a pressure plate in a match state in a diffusion device provided by at least one embodiment of the present disclosure.

For example, FIG. 10 shows another schematic cross-sectional diagram of the cooperation between the first pre-installation part and the second pre-installation part provided by at least one embodiment of the present disclosure. Referring to FIG. 8 and FIG. 10, in this embodiment, the fixation plate 5-10 includes a first plate surface 5-102, and the first pre-installation part 5-101 includes a third installation part 10-301 protruding from the first plate surface 5-102 in the axial direction (the horizontal direction in the figure), the third installation part 10-301 at least partially surrounds the first opening 5-10A and constitutes a convex part.

For example, the pressure plate 5-11 includes a second plate surface 5-112, and the second pre-installation part includes a third convex part 10-311 protruding from the second plate surface 5-112 in the axial direction (the horizontal direction in the figure), and the third convex part 10-311 at least partially surrounds the second opening 5-11A. In this embodiment, the concave part is defined by the third convex part 10-311. For example, in the case that the first pre-installation part 5-101 is matched with the second pre-installation part 5-111, at least a part of the third installation part 10-301 is inserted into the second pre-installation part which is the concave part defined by the third convex part 10-311 and the second plate surface 5-111, as illustrated in FIG. 10.

For example, in some embodiments, the third installation part 10-301 is a first closed annular structure around the first opening 5-10A, and the third convex part 10-311 is a second closed annular structure around the second opening 5-11A. In the case that the first pre-installation part is matched with the second pre-installation part, the second closed annular structure is located radially outward of the first closed annular structure and radially outermost of the pressure plate 5-11, the side surface of the concave part is constituted by the radially inner surface of the third convex part 10-311, and the bottom surface of the concave part is the second plate surface 5-111.

For example, in some embodiments, as illustrated in FIG. 10, the third convex part 10-311 has at least one threaded hole 10-312 which extends in the direction parallel to the second plate surface 5-111 (the vertical direction in the figure) and penetrates through the third convex part 10-311.

For example, a top thread 10-313 can be screwed into the at least one threaded hole 10-312, and the top thread 10-313 can abut against the third installation part 10-301, so that the position of the fixation plate 5-10 can be finely adjusted, and thus the diffusion pipe 5-S can be finely adjusted.

For example, similar to the case illustrated in FIG. 7, the at least one threaded hole 10-312 may include a plurality of threaded holes 10-312, and the plurality of threaded holes 10-312 may surround the first opening 5-10A. For example, in some examples, the plurality of threaded holes 10-312 may surround the first opening 5-10A in a circle shape; or, the plurality of threaded holes 10-312 may surround the first opening 5-10A in a half of a circle shape at a lower side of the first opening 5-10A. Because at the lower side of the first opening 5-10A, the fixation plate 5-10 bears the weight of the diffusion pipe 5-S, fine adjustment of the position of the diffusion pipe 5-S can be achieved at least in the direction of gravity by setting the threaded hole 10-312 and the top thread 10-313 at the lower side of the first opening 5-10A, thereby achieving the effect of accurately installing the diffusion pipe 5-S.

Similarly, in the assembling process of the exhaust device provided by the embodiment of the present disclosure, the first pre-installation part 5-101 of the fixation plate 5-10 and the second pre-installation part 5-111 of the pressure plate 5-11 can pre-fix the diffusion pipe 5-S by cooperating with (matching with) each other, so as to realize the initial alignment between the diffusion pipe 5-S and other components (such as the turbine), and then the diffusion pipe 5-S can be fixed, for example, the fixation plate 5-10 and the pressure plate 5-11 are fixedly connected by the bolt 5-131, as illustrated in FIG. 5 and FIG. 10, and in this way, the diffusion pipe can be accurately connected by pre-fixation and then fixing, which can simplify the assembly process, save manpower and time, and improve assembly efficiency.

Figure 11:
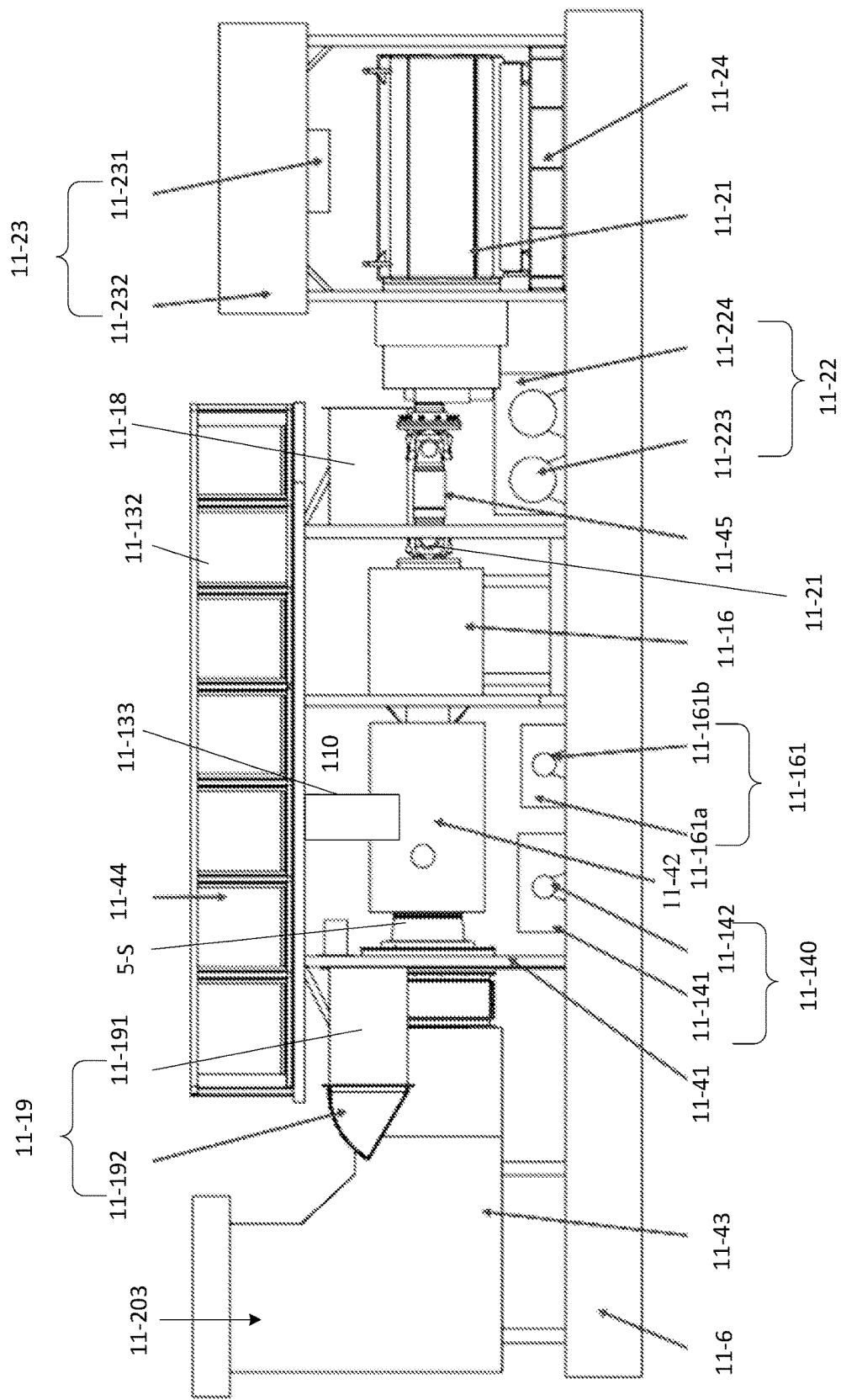
FIG. 11 is a schematic diagram of a turbine fracturing apparatus provided by at least one embodiment of the present disclosure.

At least one embodiment of the present disclosure further provides a turbine fracturing apparatus, and FIG. 11 shows a schematic diagram of the turbine fracturing apparatus. As illustrated in FIG. 11, the turbine fracturing apparatus includes a silencer cabin 11-41 and the exhaust device provided by the embodiments of the present disclosure. For example, a turbine 11-42 is disposed in the silencer cabin 11-41, for example, the silencer cabin 11-41 has an accommodation space 110, and the turbine 11-42 is disposed in the accommodation space 110. For example, a silencer 11-43 is disposed outside the silencer cabin 11-41, and the silencer cabin 11-41 has a side wall (i.e., the position indicated by the sign 11-41), the diffusion pipe 5-S is installed on the side wall, two ends of the diffusion pipe 5-S are respectively connected with the turbine 11-42 and the silencer 11-43, and the silencer 11-43 is configured to silence and guide the exhaust gas discharged by the turbine 11-42 through the diffusion pipe 5-S to the atmosphere.

For example, in some embodiments, as illustrated in FIG. 11, the silencer 11-43 includes an L-shaped gas transmission channel 11-203, one end of the gas transmission channel 11-203 has an air inlet opening, the air inlet opening communicates with the turbine 11-42 through the diffusion pipe 5-S for intaking air, and the other end of the gas transmission channel 9-201 has an upward air outlet opening for discharging the exhaust gas generated by the turbine 11-42 to the atmosphere.

For example, as illustrated in FIG. 11, the turbine fracturing apparatus may further include an air inlet device 11-44 and a clean device 11-140. For example, the turbine 11-42 and the clean device 11-140 are located in the accommodation space 110. For example, the air inlet device 11-44 is on a top of the silencer cabin 11-41, communicates with the turbine 11-42 through an air inlet pipe 11-133, and is configured to provide combustion-support gas to the turbine 11-42. For example, the air inlet device 11-44 includes a plurality of air inlet chambers 11-132 arranged side by side. For example, the air inlet device 11-44 is fixed on the top of the silencer cabin 11-41 by welding. For example, the clean device 11-140 is on a side of the turbine 11-42 away from the air inlet device 11-44, that is, below the turbine 11-42. For example, the clean device 11-140 includes a water tank 11-141 and a clean pump 11-142.

For example, as illustrated in FIG. 11, the turbine fracturing apparatus may further include a deceleration mechanism 11-16 and a lubrication system 11-161 that are located in the silencer cabin 11-41. The lubrication system 11-161 is configured to lubricate the deceleration mechanism 11-16. The deceleration mechanism 11-16 is connected to an output shaft of the turbine 11-42 and arranged in the axial direction with the turbine 11-42. For example, the lubrication system 11-161 includes a lubrication oil tank 11-161a and a driver mechanism 11-161b, the driver mechanism includes an electrical motor, that is, the lubrication system 11-161 is driven by electric power, so it can have a small volume.

For example, as illustrated in FIG. 11, the turbine fracturing apparatus may further include an air inlet assembly 11-18 and an air outlet assembly 11-19. The air inlet assembly 11-18 and the air outlet assembly 11-19 are configured to create circulation environment in the silencer cabin, which is beneficial to heat dissipation in the cabin. For example, the air outlet assembly 11-19 includes an air outlet pipe 11-191 and a lead-out part 11-192 connected with the air outlet pipe 11-191, and the lead-out part 11-192 is configured to change the direction of an air outlet opening of the air outlet assembly, so as to effectively reduce the damage to materials in the cabin caused by sand entering the silencer cabin from the air outlet assembly.

For example, as illustrated in FIG. 11, the turbine fracturing apparatus may further include a transmission mechanism 11-45, a fracturing pump 11-21 and a lubrication system 11-22 configured to lubricate the fracturing pump 11-21. The lubrication system 11-22 includes an electrical motor 11-223 and is located on a side of the transmission mechanism 11-45 away from the air inlet device 11-44. The lubrication system 11-22 further includes a lubrication oil tank 11-224.

For example, as illustrated in FIG. 11, the turbine fracturing apparatus may further include a lubrication oil heat dissipation device 11-23 configured to dissipate heat from the lubrication system 11-22. For example, the lubrication oil dissipation device 11-23 includes an electrical motor 11-231 and a dissipation device 11-232.

For example, as illustrated in FIG. 11, the turbine fracturing apparatus may further include a fracturing pump base 11-24 located below the fracturing pump 11-21, the fracturing pump base 11-24 is configured to raise the fracturing pump 11-21 to a higher position so that the fracturing pump 11-21 and the turbine 11-42 are arranged linearly along the axial direction of the turbine 11-42, thereby improving the transmission efficiency.

For example, as illustrated in FIG. 11, the turbine fracturing apparatus may further include a bottom skid 11-6, the above-mentioned components are mounted on the bottom skid 11-6 for fixing.

For example, the turbine fracturing apparatus may further include other necessary structures, and the specific structures of the turbine fracturing apparatus are not limited in the embodiments of the present disclosure.

The diffusion device of the turbine fracturing apparatus provided by the embodiments of the present disclosure can be assembled in a simple and easy assembly mode, the specific assembly mode can be referred to the above embodiments, and is not described again. Therefore, the assembly efficiency of the turbine fracturing apparatus can be improved, and manpower and time can be saved.

At least one embodiment of the present disclosure further provides an installation method of the exhaust device, and the installation method includes: fixing the fixation plate to the side wall; matching the second pre-installation part with the first pre-installation part to realize pre-fixation of the diffusion pipe; and fixedly connecting the pressure plate with the fixation plate to fix the diffusion pipe on the side wall.

For example, in some embodiments, referring to FIG. 5, in the installation process, the fixation plate 5-10 may be fixed to the side wall 5-100A first, and then the diffusion pipe 5-S is allowed to pass through the first opening 5-10A of the fixation plate 5-10 and then the diffusion pipe 5-S is allowed to pass the second opening 5-11A of the pressure plate 5-11, and then the second pre-installation part 5-111 of the pressure plate 5-11 is matched with the first pre-installation part 5-101 of the fixation plate 5-10 to realize pre-fixation of the diffusion pipe 5-S; or, in other embodiments, the diffusion pipe 5-S is first allowed to pass through the first opening 5-10A of the fixation plate 5-10 and the second opening 5-11A of the pressure plate 5-11, then the fixation plate 5-10 is fixed to the side wall 5-100A, and then the second pre-installation part 5-111 of the pressure plate 5-11 is matched with the first pre-installation part 5-101 of the fixation plate 5-10, to realize the pre-fixation of the diffusion pipe 5-S. The embodiments of the present disclosure do not specifically limit the matching sequence of the diffusion pipe 5-S with the fixation plate 5-10 and the pressure plate 5-11.

For example, the fixation plate 5-10 may be fixed to the side wall 5-100A by bolt connection or the like. The second pre-installation part 5-111 of the pressure plate 5-11 and the first pre-installation part 5-101 of the fixation plate 5-10 may adopt a match connection such as plugging connection, lap joint connection, clamping connection, and so on, to realize the pre-fixation of the diffusion pipe 5-S.

For example, after the pre-fixation is completed, the fixation plate 5-10 and the pressure plate 5-11 may be fixed by fixing means such as bolt connection, thereby fixing the diffusion pipe 5-S on the side wall 5-100A.

For example, in some embodiments, as described in the above embodiments, the second pre-installation part 5-111 and the first pre-installation part 5-101 may be configured to pre-fix the diffusion pipe 5-S by plugging connection. In this case, one of the second pre-installation part 5-111 and the first pre-installation part 5-101 includes a concave part, and the other one of the second pre-installation part 5-111 and the first pre-installation part 5-101 includes a convex part, and in the case that the second pre-installation part 5-111 is matched with the first pre-installation part 5-101, at least a part of the convex part is in the concave part. In this case, the step of matching the second pre-installation part 5-111 with the first pre-installation part 5-101 to realize the pre-fixation of the diffusion pipe 5-S includes: inserting at least a part of the convex part into the concave part to realize the pre-fixation of the diffusion pipe.

For example, in the embodiment illustrated in FIG. 6, the first pre-installation part 5-101 includes the concave part defined by the first baffle 6-104 and the first installation part 6-103, and the second pre-installation part 5-111 includes the convex part defined by the first convex part 6-113. In this case, the pre-assembly process includes: inserting at least a part of the second pre-installation part 5-111 (for example, the convex part defined by the first convex part 6-113) into the first pre-installation part (for example, the concave part defined by the first baffle 6-104 and the first installation part 6-103), so as to realize the plugging connection of the first pre-installation part 5-101 and the second pre-installation part 5-111, and further realize the pre-fixation of the diffusion pipe 5-S.

For example, in the embodiment illustrated in FIG. 9, the first pre-installation part 5-101 includes the concave part defined by the groove 9-202 of the second installation part 9-201, and the second pre-installation part 5-111 includes the convex part defined by the second convex part 9-211. In this case, the pre-assembly process includes: inserting at least a part of the second pre-installation part 5-111 (for example, the second convex part 9-211) into the first pre-installation part (for example, the groove 9-202 of the second installation part 9-201), so as to realize the plugging connection of the first pre-installation part 5-101 and the second pre-installation part 5-111, and further realize the pre-fixation of the diffusion pipe 5-S.

For example, in the embodiment illustrated in FIG. 10, the first pre-installation part 5-101 includes the convex part defined by the third installation part 10-301, and the second pre-installation part 5-111 includes the concave part defined by the third convex part 10-311. In this case, the pre-assembly process includes: inserting at least a part of the third installation part 10-301 into the concave part defined by the third convex part 10-311, so as to realize the plugging connection of the first pre-installation part 5-101 and the second pre-installation part 5-111, thereby realizing the pre-fixation of the diffusion pipe 5-S.

For example, after the diffusion pipe 5-S is fixed on the side wall 5-100A, the position of the fixation plate 5-10 or the position of the pressure plate 5-11 can be finely adjusted by the top thread, so that the position of the diffusion pipe 5-S can be finely adjusted and the diffusion pipe can be connected accurately.

To sum up, by the installation method of the exhaust device provided by at least one embodiment of the present disclosure, the first pre-installation part of the fixation plate and the second pre-installation part of the pressure plate can realize pre-fixation of the diffusion pipe by matching with (cooperating with) each other, so that the initial alignment between the diffusion pipe and other components can be realized through the pre-fixation, and then the diffusion pipe can be fixed, and the position of the diffusion pipe can be finely adjusted through the top thread. This process can improve the assembly accuracy and assembly efficiency of the diffusion pipe, and save manpower and time.

Figure 12:
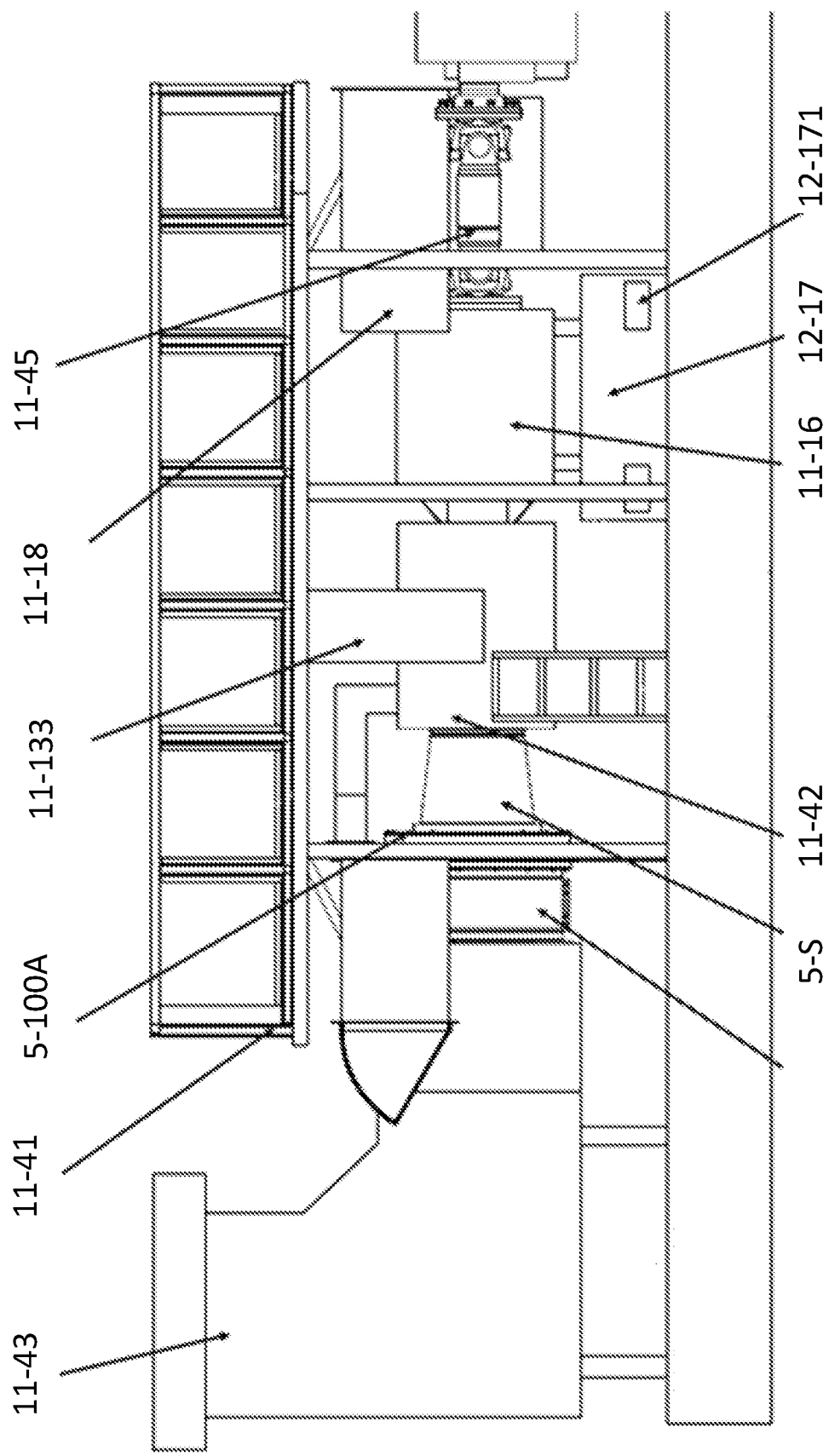
FIG. 12 is a schematic diagram of another turbine fracturing apparatus provided by at least one embodiment of the present disclosure.

FIG. 12 is a schematic diagram of another turbine fracturing apparatus provided by at least one embodiment of the present disclosure.

As illustrated in FIG. 12, the turbine fracturing apparatus includes: a silencer cabin 11-41, an air inlet assembly 11-18, a transmission mechanism 11-45 and the exhaust device according to any one of the above-mentioned embodiments. A turbine 11-42, a deceleration mechanism 11-16 and a deceleration mechanism base 12-17 are provided in the silencer cabin 11-41, the diffusion pipe 5-S, the turbine 11-42, the deceleration mechanism 11-16 and the transmission mechanism 11-45 are sequentially connected along an axial direction of the diffusion pipe 5-S, the deceleration mechanism base 12-17 is connected with the deceleration mechanism 11-16 and detachably fixed on a wall surface of the silencer cabin 11-41 close to the ground, the silencer cabin 11-41 includes the side wall 5-100A, the diffusion pipe 5-S is stalled on the side wall 5-100A, and the air inlet assembly 11-18 and the diffusion pipe 5-S are respectively on two side walls opposite to each other of the silencer cabin 11-41.

At least one embodiment of the present disclosure further provides a disassembly method of the turbine on the above-mentioned turbine fracturing apparatus, and the method includes: in the case that the air inlet assembly 11-18 does not need to be dismantled, disconnecting the connection between the deceleration mechanism 11-16 and the transmission mechanism 11-45, and disconnecting the connection between the diffusion pipe 5-S and the turbine 11-42 and the connection between the diffusion pipe 5-S and the side wall 5-100A; moving the diffusion pipe 5-S away from the turbine 11-42 by a first distance, and moving a whole composed of the turbine 11-42, the deceleration mechanism 11-16 and the deceleration mechanism base 12-17 towards the diffusion pipe 5-S by a second distance, so that the deceleration mechanism 11-16 avoids the air inlet assembly 11-18 in a direction perpendicular to the axial direction of the diffusion pipe, in which the first distance is greater than or equal to the second distance; and moving the whole composed of the turbine 11-42, the deceleration mechanism 11-16 and the deceleration mechanism base 12-17 out of the silencer cabin 11-41 along the direction perpendicular to the axial direction of the diffusion pipe 5-S.

For example, the deceleration mechanism base 12-17 includes a forklift hole 12-171, the whole composed of the turbine 11-42, the deceleration mechanism 11-16 and the deceleration mechanism base 12-17 may be moved out of the silencer cabin 11-41 by adopting a forklift through the forklift hole 12-171.

The method further includes: in the case that the air inlet assembly needs to be dismantled, dismantling the air inlet assembly 11-18 from the silencer cabin 11-41; disconnecting the connection between the deceleration mechanism 11-16 and the transmission mechanism 11-45, and disconnecting the connection between the diffusion pipe 5-S and the turbine 11-42 and the connection between the diffusion pipe 5-S and the side wall 5-100A; and moving the whole composed of the turbine 11-42, the deceleration mechanism 11-16 and the deceleration mechanism base 12-17 out of the silencer cabin 11-41 along the direction perpendicular to the axial direction of the diffusion pipe 5-S.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof

We claim:

1. A system comprising an exhaust assembly, the exhaust assembly comprising:
   an exhaust diffuser pipe;
   a body comprising a side wall;
   an annular fixation plate, configured to be fixed to the side wall and sealedly encircling a transversal cross section of the exhaust diffuser pipe; and
   an annular pressure plate, configured to be fixedly connected with the annular fixation plate and sealedly encircling the transversal cross section of the exhaust diffuser pipe,
   wherein the annular fixation plate and the annular pressure plate are configured to pre-fix the exhaust diffuser pipe to the body by being fixedly coupled to the body while sealedly encircling the transversal cross section of the exhaust diffuser pipe.

2. The system of claim 1, wherein exhaust diffuser pipe is of a conical frustum shape having a first end and a second end being configured to be coupled to an exhaust end of a turbine engine and a silencer, respectively.

3. The system of claim 2, wherein the transversal cross section is located in a mid-section of the exhaust diffuser pipe.

4. The system of claim 2, wherein the exhaust assembly further comprises the silencer and wherein the silencer is configured to guide an exhaust of the turbine engine from the exhaust diffuser pipe in an exit direction perpendicular to an exhaust path in the exhaust diffuser pipe.

5. The system of claim 2, wherein the silencer is configured to guide an exhaust of the turbine engine from the exhaust diffuser pipe in an exit direction along an exhaust flow direction in the exhaust diffuser pipe.

6. The system of claim 2, wherein the side wall comprises an opening and wherein the exhaust diffuser pipe passes through the opening when the exhaust diffuser pipe is pre-fixed to the body.

7. The system of claim 6, wherein the body further comprises an exhaust duct fixedly connected to the side wall and encloses at least a portion of the exhaust diffuser pipe.

8. The system of claim 1, wherein:
   The annular fixation plate further comprises a first pre-installation part;
   the annular pressure plate further comprises a second pre-installation part; and
   the second pre-installation part is commensurate with the first pre-installation part to facilitate pre-fixing the exhaust diffuser pipe to the body.

9. The system of claim 8, wherein the second pre-installation part is configured to couple to the first pre-installation part as a plug-in.

10. The system of claim 8, wherein:
    one of the first pre-installation part and the second pre-installation part comprises a concave portion;
    other one of the first pre-installation part and the second pre-installation part comprises a convex portion; and
    the second pre-installation part and the first pre-installation part are configured to couple to each other with at least a part of the convex portion fitting in the concave portion.

11. The system of claim 1, further comprising a turbine engine fueled by natural gas or diesel as a power source, wherein the exhaust diffuser pipe is configured to be fixedly connected to an exhaust end of the turbine engine.

12. The system of claim 11, further comprising a plunger pump, wherein the turbine engine is connected to the plunger pump via a connection device.

13. The system of claim 12, wherein:
    the connection device comprises a reduction gearbox; and an input speed of the reduction gearbox is commensurate with an output driving speed of the turbine engine, and an input torque of the reduction gearbox is commensurate with an output driving torque of the turbine engine.

14. The system of claim 13, wherein the exhaust diffuser pipe and at least one of rotational shafts of the turbine engine are disposed in a straight line along a transmission direction of mechanical driving power of the turbine engine.

15. The system of claim 14, wherein the reduction gearbox is integrated with the plunger pump.

16. The system of claim 14, wherein an output driving end of the turbine engine directly connects to the reduction gearbox.

17. The system of claim 14, wherein the exhaust diffuser pipe, at least one of rotational shaft of the turbine engine and at least one of driving axes of the reduction gearbox, and a transmission shaft of the plunger pump are disposed in the straight line along the transmission direction of mechanical driving power of the turbine engine.

18. The system of claim 14, wherein the turbine engine is adapted to be fueled by natural gas delivered to the turbine engine by any one of:
   a compressed natural gas (CNG) tanker through CNG pressure regulating equipment;
   a liquid natural gas (LNG) tanker through LNG gasification conveying equipment;
   a wellhead gas treatment equipment connected to a gas port of a wellhead; or
   a gas pipeline connected to pipeline gas treatment equipment.

19. The system of claim 14, wherein the plunger pump is a five-cylinder pump.

* * * * *